(12) United States Patent
Reinhold

(10) Patent No.: US 11,457,001 B2
(45) Date of Patent: *Sep. 27, 2022

(54) SYSTEM AND METHOD FOR SECURELY ENCRYPTING DATA

(71) Applicant: Arnold G. Reinhold, Cambridge, MA (US)

(72) Inventor: Arnold G. Reinhold, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/125,887

(22) Filed: Dec. 17, 2020

(65) Prior Publication Data

US 2021/0152532 A1 May 20, 2021

Related U.S. Application Data

(63) Continuation-in-part of application No. 16/104,918, filed on Aug. 19, 2018, now Pat. No. 10,873,458, which is a continuation-in-part of application No. 15/496,082, filed on Apr. 25, 2017, now Pat. No. 10,057,065.

(60) Provisional application No. 63/026,167, filed on May 18, 2020, provisional application No. 62/328,948, filed on Apr. 28, 2016.

(51) Int. Cl.
*H04L 9/40* (2022.01)
*H04L 9/32* (2006.01)
*H04L 9/08* (2006.01)

(52) U.S. Cl.
CPC ........ *H04L 63/0471* (2013.01); *H04L 9/0869* (2013.01); *H04L 9/3215* (2013.01); *H04L 63/08* (2013.01)

(58) Field of Classification Search
CPC ... H04L 63/0471; H04L 63/08; H04L 9/0868; H04L 9/3215
USPC ....................................................... 713/168
See application file for complete search history.

(56) References Cited

U.S. PATENT DOCUMENTS 1,310,719 A 7/1919 Vemam
6,583,712 B1 6/2003 Reed et al.
(Continued)

OTHER PUBLICATIONS

Boak, D. G., "A History of U.S. Communications Security (vols. I and II); the David G. Boak Lectures," National Security Agency (NSA), revised Jul. 1973, declassified in 2008 and 2015, p. 39; downloaded from URL: http://www.governmentattic.org/18docs/Hist_US_COMSEC_Boak_NSA_1973u.pdf.
(Continued)

*Primary Examiner* — Michael S McNally
(74) *Attorney, Agent, or Firm* — Armis IP Law, LLC

(57) ABSTRACT

A system for encryption includes a message management module (MMM); a restricted secret server (RSS) including a restricted secret server network interface (RSS-NI) connected to the MMM and including at least one very large key (VLK) module. The system uses Terakey™ an encryption system whose intrinsic security can be demonstrated from first principles, without making assumptions about the computational difficulty of mathematical problems, such as factoring large integers or computing logarithms in finite groups. It employs a key that is much larger than the anticipated volume of message traffic. The large size of the key also reduces the risk of side channel attacks and facilitates realistic security measures to maintain a secure chain of custody for the key.

19 Claims, 9 Drawing Sheets

(56) References Cited

U.S. PATENT DOCUMENTS

| | | | |
|---|---|---|---|
| 7,746,224 | B2 | 6/2010 | Addy |
| 7,843,322 | B2 | 11/2010 | Blum et al. |
| 9,021,269 | B2 | 4/2015 | Spilman |
| 9,509,802 | B1 | 11/2016 | Stalling et al. |
| 2003/0202661 | A1 | 10/2003 | Rodriguez et al. |
| 2008/0086780 | A1* | 4/2008 | Chen .................. G06F 21/572 348/E7.061 |
| 2008/0133679 | A1 | 6/2008 | Addy |
| 2010/0030856 | A1 | 2/2010 | Blum et al. |
| 2014/0022849 | A1 | 1/2014 | Krutzik et al. |
| 2014/0215613 | A1* | 7/2014 | Kelley .................. G06F 21/86 726/23 |
| 2014/0240915 | A1 | 8/2014 | Phelan et al. |
| 2016/0044034 | A1* | 2/2016 | Spilman .............. H04L 63/0876 713/181 |
| 2016/0132415 | A1 | 5/2016 | Dillard et al. |
| 2016/0155163 | A1 | 6/2016 | White et al. |
| 2016/0205140 | A1* | 7/2016 | Verma .................. H04L 63/20 726/1 |
| 2017/0193787 | A1 | 7/2017 | Devdas et al. |
| 2017/0330290 | A1 | 11/2017 | Schuh |
| 2018/0004930 | A1 | 1/2018 | Csinger et al. |

OTHER PUBLICATIONS

Chen, C., "Zeusminer Delivers Lightning, Thunder, and Cyclone Scrypt ASICs for Litecoin and Dogecoin Mining", CryptoCoins News, 3 pages, May 21, 2014; downloaded from URL: http://www.cryptocoinsnews.com/news/zeusminer-delivers-lightning-thunder-cyclone-scrypt-asics-litecoin-dogecoin-mining.

Morris, R. and Thompson, K., "Password Security: A Case History", Bell Laboratories, 6 pages (1978); downloaded from URL: https://www.bell-labs.com/usr/dmr/www/passwd.ps.

No Author Given, "Blind Hashing Technology Overview", 2 pages, No Date Provided; downloaded on Apr. 20, 2017 from URL: https://taplink.co/technology/.

No Author Given, "How does Rubberhose work?", 2 pages, archived by archive.org on Nov. 24, 2004; downloaded from URL: https://web.archive.org/web/20041124173754/http://iq.org:80 ĩ proff/rubberhose.org/current/src/doc/maruguide/x32.html.

No Author Given, "Rubberhose", 2 pages, No Date Given; downloaded on May 23, 2017 from URL: httpps://web.archive.org/web/20031206045542/http://www.iq.org:80 ĩ proff/rubberhose.org/.

Percival, C., "Stronger Key Derivation Via Sequential Memory-Hard Functions", 16 pages, no date given; downloaded from URL: https://www.tarsnap.com/scrypt/scrypt.pdf.

Reinhold, A., "HEKS: A Family of Key Stretching Algorithms", 11 pages, (1999); downloaded from URL: http://world.std.com ĩ reinhold/HEKSproposal.html.

Reinhold, A., "One-Time Pad: Difference Between Revisions", Wikipedia, 12 pages, Apr. 1, 2005; downloaded from URL: httpps://en.wikipedia.org/w/index.php?title=One-time_pad&type=revisions&diff=11771171&oldid=11763901.

Schneier, B., "Schneier on Security, Deniable File System", 28 pages, Apr. 2006; downloaded from URL: https://www.schneier.com/blog/archives/2006/04/deniable_file_s.html.

\* cited by examiner

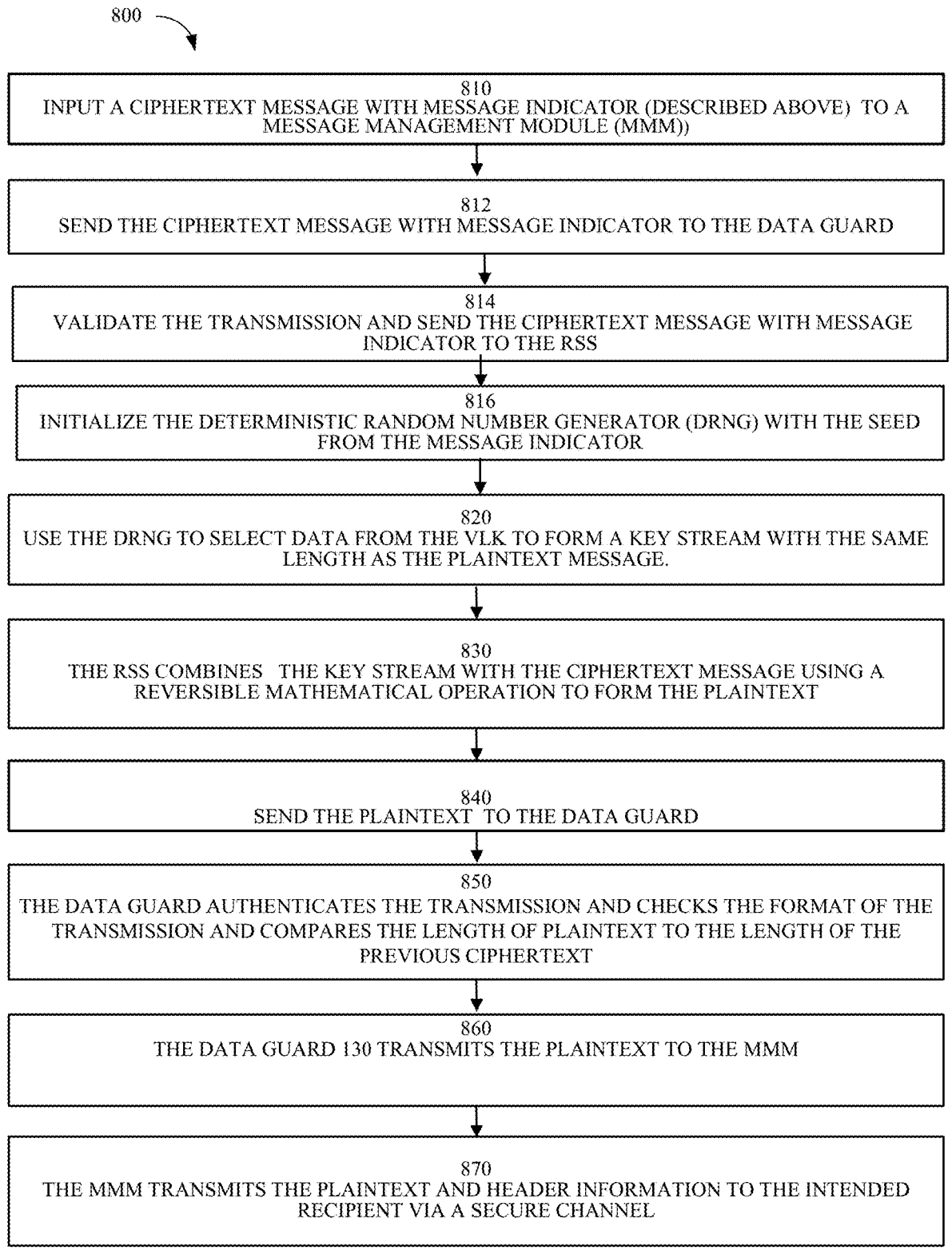

SYSTEM AND METHOD FOR SECURELY ENCRYPTING DATA

RELATED APPLICATIONS

This application claims the benefit of U.S. Provisional Application No. 63/026,167, filed May 18, 2020, and entitled SYSTEM AND METHOD FOR SECURELY ENCRYPTING DATA; and is a continuation in part of U.S. application Ser. No. 16/104,918, filed Aug. 19, 2018, and entitled SYSTEM AND METHOD FOR SECURELY STORING AND UTILIZING PASSWORD VALIDATION DATA now U.S. Pat. No. 10,873,458 issued Dec. 22, 2020; which application is a continuation in part of U.S. application Ser. No. 15/496,082, filed Apr. 25, 2017, entitled SYSTEM AND METHOD FOR SECURELY STORING AND UTILIZING PASSWORD VALIDATION DATA, now U.S. Pat. No. 10,057,065 issued Aug. 21, 2018, which claims the benefit of U.S. Provisional Application No. 62/328,948 filed Apr. 28, 2016, entitled A Method for Securely Storing and Utilizing Password Validation Data, which applications are hereby incorporated herein by reference in their entireties.

FIELD OF THE INVENTION

Embodiments of the present invention relate to computer security and more specifically to encryption system using a very large key (Terakey) module, a message management module (MMM) and a restricted secret server (RSS).

BACKGROUND OF THE INVENTION

Modern encryption methods convert data between plaintext and cipher text under the control of a block of data called a key. Security depends keeping that key secret from everyone but the persons or devices authorized to access the data. Asymmetric or "public key" encryption systems employ two keys, one that is published for use in encrypting data and a private key for decrypting it. For security, the private key must be kept secret from unauthorized entities.

Conventional encryption methods can be divided into two classes based on the size of the key:

Ciphers, where the key is much smaller than typical plaintext (this category includes both symmetric and asymmetric encryption methods); and The one time pad (OTP), where the key used to encrypt a message is equal in size to the plaintext.

Some ciphers, such as AES, are highly regarded, but to date there is no formal proof of their security, at least not in the public record. Published attacks on RC4, MD5 and SHA1 raise some (perhaps small) doubt as to the ultimate invulnerability of cipher algorithms. Quantum computers could attack some asymmetric ciphers. The one time pad, however, when constructed correctly and used properly, is provably secure. In addition, systems that are based on relatively short keys are subject to a variety of side channel attacks, such as the recent Spectre category that exploits features of modern processors that improve performance.

SUMMARY OF THE INVENTION

A system for encryption includes a message management module (MMM), a restricted secret server (RSS) including a restricted secret server network interface (RSS-NI) connected to the MMM and including at least one very large key (VLK) module, Data Guard disposed between the RSS-NI and the at least one VLK module and wherein the Data Guard is configured to restrict and sanitize request data by enforcing message formats and restricting a transfer rate of very large key (VLK) data. Such a system provides a more secure system and method for encrypting data.

One technique for encrypting data includes receiving a first message on at least one message management module (MMM), securely sending the first message to a restricted secret server (RSS) having a very large key (VLK) module, wherein securely sending a message to the RSS includes: sending the message via a secure, authenticated link to at least one Data Guard, authenticating the message on the at least one Data Guard and forwarding the message from the at least one Data Guard via a dedicated link to the RSS, wherein the at least one Data Guard is a module located within the RSS, and wherein the at least one Data Guard provides an interface between a restricted secret server network interface (RSS-NI) and the RSS. The technique further includes using a deterministic random number generator (DRNG) R on the RSS, seeding the DRNG with a seed, using the seeded DRNG to select multiple subsets of data from a block of unpredictable data, combining the multiple subsets of data from the block of unpredictable data to form a key stream and using a reversible operation to combine the key stream with a portion of the first message to create a second message. The technique still further includes securely sending the second message to the at least one MMM, wherein securely sending a return message comprises: sending the return message from the restricted secret server via a second dedicated link to the at least one Data Guard, authenticating the second message on the at least one Data Guard and forwarding the second message via a secure, authenticated link to the at least one MMM and wherein only the at least one MMM can query the RSS using a secure link within one of: a data center's intranet to access the RSS and a direct communication link between the at least one MMM and the RSS.

In a further embodiment the technique includes loading the block of unpredictable data K into a Very Large Key (VLK) module, where K is a generated key string having a length greater than one gigabyte; converting plaintext byte of a message, $P(n)$, to cipher text by $C(n)=P(n) \circ K(R(v, n))$ where v is a message indicator, o is a reversible operation such as bit-wise exclusive-or (xor) or modular addition that combines two bytes to form a third byte, P is a string of bytes that is plaintext, C is a string of bytes that is the cipher text, n is an index variable, so $P(n)$ is an nth byte in P, R is a deterministic pseudo-random number generator, v is a message indicator which serves as the seed to the pseudo-random number generator and $R(v, n)$ is an nth byte output from R when it is initialized by v.

In a further embodiment K has a length greater than one terabyte. In a further embodiment, the calculations converting a plaintext to a ciphertext are performed in a separate, dedicated computer processor referred to herein as a Restricted Secret Server.

In a further embodiment the storage device is a physically secure module and a Data Guard is used to protect a rate at which data can be extracted from the physically secure module storing K. The Data Guard is another dedicated computer processor that is the only route for data to flow from the RSS to other parts of the system, including the Message Management Module (MMM). The processor architecture used in the Data Guard may be of the Harvard type, where data and instructions are stored separately, reducing the risks of attack types such as buffer overflows.

The Message Management Module (MMM) in one embodiment is a computer program that handles electronic messages, such as e-mail, instant messages, digital telephony, video conferencing. It may be part of a larger system, such as Microsoft Windows, Android, Linux, Apple's MacOS or iOS.

A computer readable storage medium for tangibly storing thereon computer readable instructions includes instructions for securely storing and utilizing encryption data. Embodiments of the invention include any type of computerized device, workstation, handheld, tablet or laptop computer, field-programmable gate array, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk, solid state drive, or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

It is to be understood that the features of the system and method for securely encrypting and decrypting data can be embodied strictly as a software program, as software and hardware, or as hardware alone such as within a single processor or multiple processors, within a virtual machine, or within an operating system or within a software application. Security features of the VLK module can be embodied as mechanical devices alone or in combination with hardware and software devices. The processes of encryption and decryption are encompassed in the term message transformation.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

FIG. 8 is a flow chart of processing steps performed to decrypt data in accordance with embodiments disclosed herein.

DETAILED DESCRIPTION OF THE INVENTION

There is a need to provide secure encryption and decryption for data. Embodiments of the present invention are intended to be impregnable to cyber attacks described above. These embodiments offer full encryption and decryption capabilities. Certain embodiments combine unique hardware features with techniques to improve the security operations of conventional systems as described below.

Figure 1A:
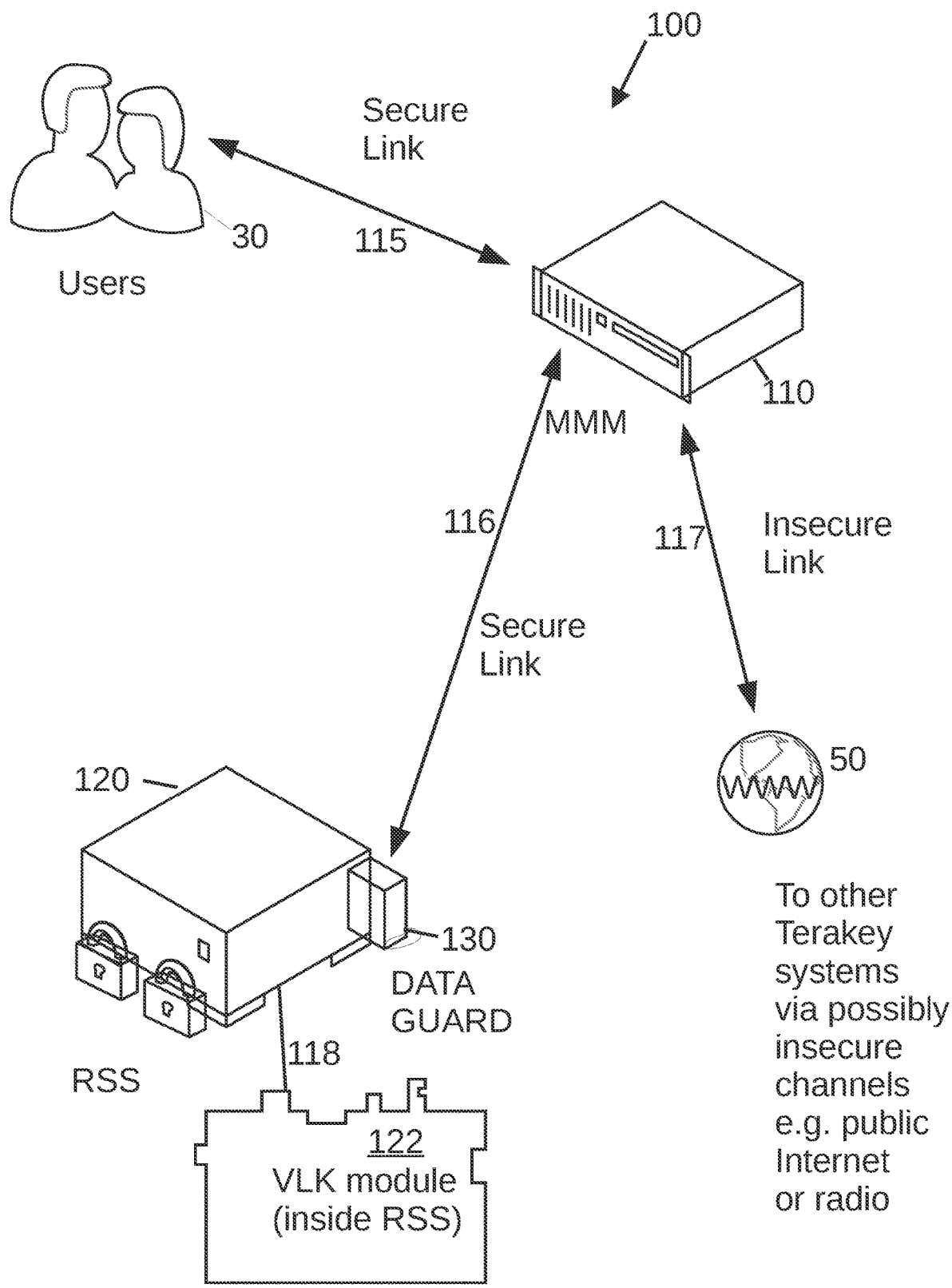
FIG. 1A is a block diagram of a system for securely encrypting and decrypting data including a Message Management Module (MMM) according to embodiments herein.

Referring now to FIG. 1A, an exemplary system 100 for securely encrypting and decrypting data in a typical Terakey installation includes a Message Management Module (MMM) 110 connected to a restricted secret server (RSS) 120. The RSS 120 includes a very large key (VLK) module 122 which in one embodiment is inside the RSS 120 and in another embodiment is removable from the RSS 120. Link 115 between users 30 and the MMM 110 is a secure link. Link 116 between the MMM 110 and the RSS 120 is a secure link. Link 117 between the MMM 110 and other Terakey systems over the Internet is an insecure link.

For encryption, users 30 send plaintext to the MMM 110. The MMM 110 sends the message text to the Restricted Secret Server (RSS) 120, by way of a Data Guard 130. The Data Guard 130 verifies the format of the transmission and checks its length against pre-specified limits to ensure that key material from the Very Large Key module (VLK) 122 is not used at too fast a rate. The RSS 120 then applies the Terakey algorithm (described below) to a plaintext message so as to encrypt it. In one embodiment, the seed for a random number generator (RNG) would be randomly generated in the RSS 120. This prevents the seed from being crafted in ways that expose specific sections of the VLK 122. However, the seed can also be generated outside the RSS 1020 and transmitted to the RSS 1020 along with the plaintext. The resulting ciphertext would then be transmitted back to the MMM 110 via the Data Guard 130. If the seed was generated in the RSS 120 it would be transmitted to the MMM 110 via the Data Guard 130 along with the ciphertext. The Data Guard 130 checks that the ciphertext returned is no longer than the plaintext received.

The MMM 110 then incorporates the seed into the message indicator, formats the message for transmission and transmits the completed encrypted message via channels such the public Internet, cellular radio or similar means to other stations that hold the same Terakey.

Encrypted messages from other stations that hold the same Terakey are received by the MMM 110, where the message indicator would be extracted from the message and sent to the RSS 120 along with the ciphertext again via the Data Guard 130. In the RSS 120, the Terakey algorithm is applied to decrypt the message using a seed derived from the message indicator. The plaintext is then returned to the MMM 110 over secure link 114 via the Data Guard 130, which would again check message formats and ensure that the plaintext returned was not longer than the ciphertext. This comparison prevents compromising more VLK 126 contents than are necessary to perform encryption or decryption.

Figure 1B:
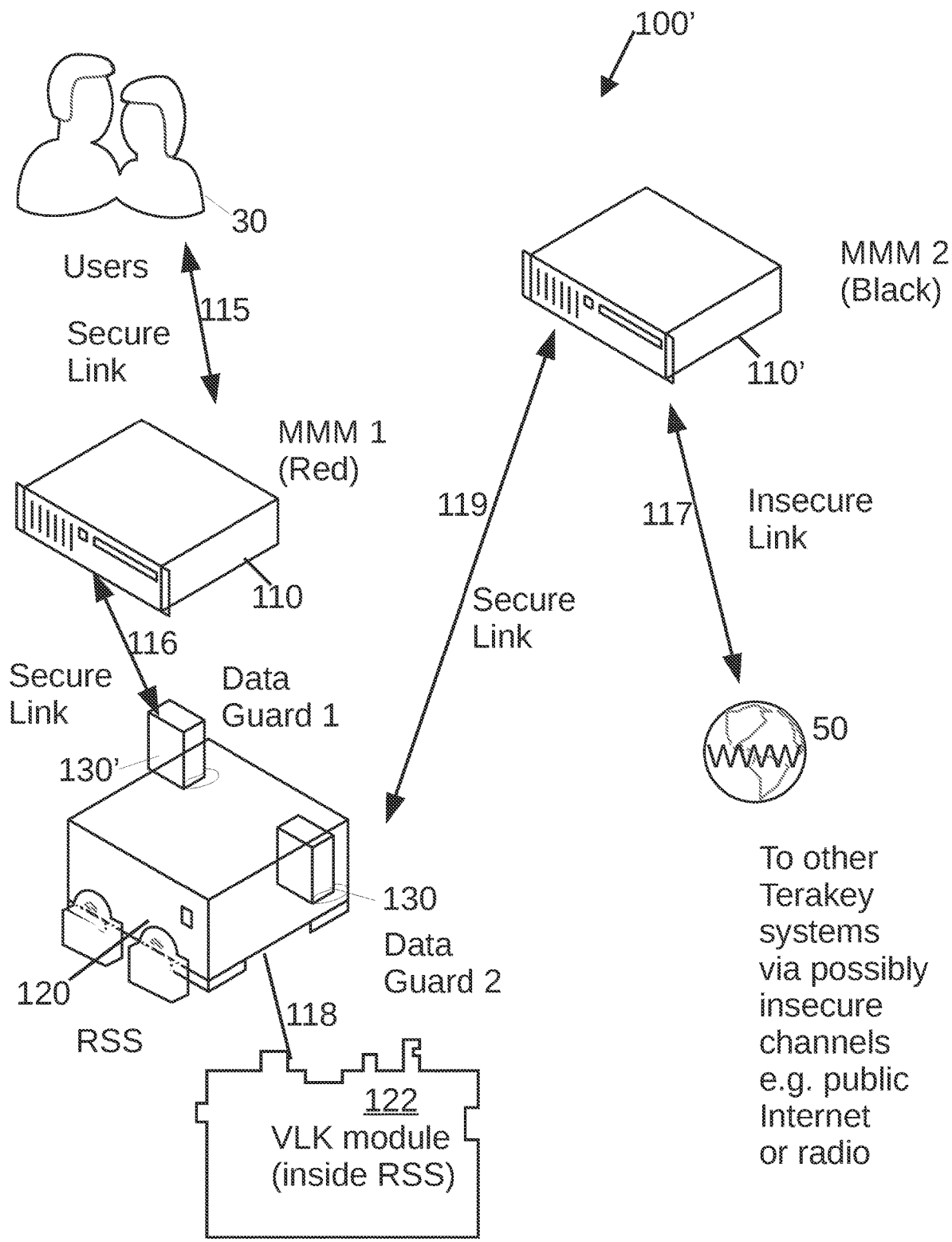
FIG. 1B is a block diagram of a alternate system for securely encrypting and decrypting data similar to the system of FIG. 1A and including a Red MMM and a Black MMM.

Referring now to FIG. 1B, an exemplary system 100' for securely encrypting and decrypting data similar to system 100 of FIG. 1A includes two separate MMMs Red MMM1 110 and Black MMM2 110' for ciphertext and plaintext. The red side is usually considered the internal side, and the black side the more public side. This facilitates maintaining the Red/Black separation, so that sensitive plaintext material is kept separate from encrypted material. Here a message originated is sent to the Red MMM1 110 via a Data Guard1 130' to the RSS 120 where are the Terakey algorithm is applied. The ciphertext and seed are then sent to the Black MMM2 110' where as in the first case they are formatted into a standard message and sent via the public Internet or any other channels, even if they are insecure. Link 115 between users 30 and the MMM1 Red 110 is a secure link. Link 116 between the MMM1 Red 110 and the RSS 120 through Data Guard 1 130' is a secure link. Link 119 between the MMM2 Black 110' and the RSS 120 through Data Guard 2 130 is a secure link. Link 117 between the MMM2 Black 110' is and other Terakey systems over the Internet is an insecure link.

For the reverse direction, a ciphertext message is received at the Black MMM 110' and transmitted to the RSS1020 via the Data Guard2 130. There, the seed is extracted from the message indicator and the Terakey decryption algorithm is applied, producing plaintext. The plaintext is transmitted to the Red MMM2 110' where it is forwarded to users working in a suitably protected Red area.

A configuration with two MMMs, MMM1 110 Red and MMM2 110' Black, and only one Data Guard 130 is also possible. In this case all messages from the two MMSs are sent to and received from the single Data Guard 130. This configuration facilitates comparing the set and received messages from the MMMs, in terms of length.

Message Management Module (MMM)

The MMM 110 includes features to allow electronic messages to be transmitted and received via any of a variety of channels, such as the public internet, enterprise intranets, cellular radio, communication satellites, or high frequency radio. It is similar to existing means for such purposes, such as e-mail clients, instant messaging apps, social media apps and video conferencing tools, except with modifications as necessary to route plaintext and ciphertext messages to the RSS for encryption and decryption.

Restricted Secret Server (RSS)

The RSS 120 produces a repeatable pseudo-random key stream in response to each incoming plaintext message from the MMM 110. The key stream is then combined with the plaintext message byte by bit or bit by bit to produce a cipher text. While this could be done inside the MMM, there is a risk that the secret repeatable pseudo-random key stream could be leaked via a side channel attack or stealthily purloined by an insider. Side channel leaks from, e.g. electromagnetic radiation (Tempest), active electromagnetic illumination (radar), covert implants, power line fluctuations and even acoustical noise are notoriously hard to suppress. Encryption can also be achieved using well known conventional ciphers such as AES. However there is NP published mathematical proof that such ciphers are secure. Also the short keys used with such ciphers, only 32 bytes in the case of AES-256, are subject to leakage and side channel attacks as well.

The approach here is to use as a master secret key a long string of random or otherwise unpredictable data, referred to as a very large key (VLK). In various embodiments, the VLK is perhaps hundreds of gigabytes, terabytes, tens, hundreds or thousands of terabytes. The large key size is not primarily intended to increase security against cryptanalytic attack. Much smaller key sizes, (e.g., 256 bits), are currently considered impregnable for symmetric ciphers. The vastly larger size of the VLK is intended to reduce the number of times each key byte is reused to a small number on average and to make theft of the secret key difficult or impossible by requiring a long enough time to copy or transfer it so that physical security measures can be initiated to halt the copying before large portions of the secret key can be copied.

In one embodiment the VLK module 122 is removable from the restricted secret server 120. In another embodiment, the removable VLK is stored in the RSS 120 which along with the RSS 120 computing resources is stored in a strong physical enclosure (not shown). A secure interlock between the VLK module 122 and the restricted secret server can also be provided. In another embodiment, the removable VLK module 122 is in a sealed unit designed to plug only into a corresponding restricted secret server 120. In yet another embodiment, the sealed unit uses non-standard connector pin-outs, the sealed unit uses a body that mechanically interlocks with a restricted secret server housing or the sealed unit uses non-standard connector pin-outs and mechanically interlocks that are custom designed for each customer installation. These measures only allow VLK modules to be inserted into corresponding restricted secret servers and be connected electrically. Attempts to insert an unauthorized VLK module are restricted mechanically, will not operate electrically, and can generate a VLK module alarm, as can unauthorized removal, alerting security personal of a possible attempt to compromise VLK data.

In both the various embodiments, a random seed is generated for each message to be encrypted. The seed is then incorporated in the header of the encrypted message as an indicator or part of an indicator. For decryption, the indicator in an incoming encrypted message is used to determine the seed of the pseudo-random number generator (PRNG). This PRNG, in turn, would be used to select a string of random values from the VLK. In the case of a block-structured device, such as NAND flash or a rotating hard drive, some number of randomly selected blocks or pages (say 6) would read and then a string of bits, say 256 (32 octets), would be pseudo-randomly selected from the contents of those pages using the seeded PRNG. The selected bits from all the pages would be concatenated to form the key stream.

It is difficult, if not impossible, to reduce the rate of side channel leakage to a point where compromise of a typical cryptographic key, typically only a few hundred bits long, can be reliably prevented. But preventing the leakage of significant portions of a multi-gigabyte or terabyte key is more feasible. The RSS 120 parameters can be chosen to sample many parts of the VLK for each key stream generated, so that leakage of a small fraction of the VLK, the amount an attacker could possibly copy in a time short enough to evade detection by security surveillance and alarms, is unlikely to allow the attacker to recover enough key stream to decrypt an encrypted message.

The operation of the RSS 120 in one embodiment can be described by the following pseudo code:

```
// RSS pseudo code
Start: Wait for frame ready signal on input
Read Frame_length bits from input
If checksum invalid go to start
If instruction_code == check status
    Assemble status information
    Fill output frame buffer with messageID, status information
    Go to start
If instruction_code! = encrypt or decrypt, go to start
// key stream generation
If encrypt, generate a random seed
else if decrypt, extract seed from incoming message indicator
Initialize PRNG with seed
Initialize output_buffer to zero length
Initialize key_buffer to zero length
Initialize page_buffer to zero length
Initialize TK_address_array to (0, 1, ... number of VLK modules)
Using PRNG randomly shuffle TK_address_array
for i = 1 to number_of_VLK_modules
    Select a page from the VLK module (TK_address_array(i))
    Using PRNG randomly select Bytes_per_module bytes from page and append them to
key_buffer
end
If (number_of_VLK_modules < desired_VLK_module_accesses) then
    for i = 1 to (desired_VLK_module_accesses – number_of_VLK_modules)
        Select a random number k from the range (0 ... desired_VLK_module_accesses –
number_of_VLK_modules)
        Select a page from VLK module (k)
        Using PRNG randomly select Bytes_per_module bytes from page and append them to
key_buffer
        Append page to page_buffer
    end
// optional step
for i = 1 to length of message text (plain of cipher)
    Using PRNG randomly select Bytes_per_module bytes from page_buffer and append them to
key_buffer
end
// end optional step
if encrypt, combine message plaintext with key buffer using reversible mathematical operation,
such as bit-wise exclusive or (XOR)
// XOR'd output is the encrypted message cipher text
transmit seed and ciphertext to MMM via Data Guard
else if decrypt, combine message ciphertext with key buffer using reversed mathematical
operation, such as bit-wise exclusive or (XOR)
// XOR'd output is the decrypted message plaintext
transmit plaintext to MMM via Data Guard
Checksum: Calculate new checksum
insert checksum in output frame buffer
Raise frame ready signal on output
Transmit output frame buffer
Go to start
```

RSS Network Interface

The RSS Network Interface (RSS-NI) 124 includes a computer or other digital logic device that connects to the MMM 110, in one embodiment, via a standard network connection, such as Ethernet, using TCP/IP or perhaps using UDP datagrams for performance. In another embodiment, a direct communication path 116 connects the MMM 110 with the RSS 120, perhaps using USB, RS-232, RS-422, I2C or a fiber optic link. In the absence of a delivery guarantee, the MMM 110 could maintain a queue of request messages and resend if one was not responded to within some time window. Communications between the MMM 110 and the RSS-NI 125 could be encrypted, perhaps using standard technologies such as SSH, VPN, TLS, public key cryptography, or perhaps a proprietary protocol. The RSS-NI 125 need not be inside the RSS 120 secure container. The RSS-NI 125 communicates with the RSS 120 directly or, for added security, through the Data Guard as described below in conjunction with FIG. 2. If the direct communication path 116 is used, the MMM 110 could communicate directly with the Data Guard. The message format is highly constrained and fixed in size in either case, to prevent attacks such as buffer overflows or crashes due to poor handling of invalid message formats. Invalid messages are easy to detect and can simply be discarded.

In contrast to conventional techniques, the VLK is static. It can be copied offline in a secure environment when additional restricted secret servers are needed. Once in place, no additional backup or synchronization between restricted secret servers is needed.

Terakey™ is an encryption system that employs a key that is much larger than the anticipated volume of message traffic. Its intrinsic security can be demonstrated from first principles, without making assumptions about the computational difficulty of mathematical problems, such as factoring large integers or computing logarithms in finite groups. The large size of the key facilitates realistic security measures to maintain a secure chain of custody for the secret keying data.

Terakey extends the provable security of the one-time pad (OTP) to network operation. A central requirement for one-time pad security is that pad data never be used more than once. This requirement has largely limited traditional one-time pads to protecting either a single pair of communicators or a star network topology where a central station decrypts each message from an originator and re-encrypts it for the destination. Terakey attempts to satisfy the no-reuse requirement statistically, by using a very large unpredictable secret key, the Terakey, that is shared with all stations. Any pair of stations can, in effect, create a unique one-time pad from the Terakey. There is a risk of collisions where Terakey bytes are used more than once. The risk is quantifiable and can be kept low by having the Terakey be much larger than the anticipated volume of traffic. A variety of approaches are presented to deal with the infrequent collisions that still can occur.

Terakey's large key size has the additional advantage of making theft of the key more difficult. While designers of existing encryption systems generally consider short keys a virtue, this assumption may not be valid in all circumstances. Lightweight keys, a few thousand bits or less, can be surreptitiously exfiltrated via low-bandwidth side channels. A heavy-weight Terakey makes such attacks less feasible. Terakey size can be chosen to require a minimum physical size and mass for its storage, based on current and projected storage technology. Larger physical objects can be more easily protected by physical security. The Terakey can be stored in an isolated module within a guarded security safe and protected by a Data Guard™ that verifies the format of message and restricts the rate of data retrieved from the Terakey storage device.

Terakey is designed for applications where prior secure physical transport and storage of the key file is feasible, though keys can be refreshed remotely. It can be used for communication between fixed sites, such as financial institutions with multiple branches, or with mobile facilities of sufficient size. Terakey can be used to protect moderate sized message traffic, such as text-only electronic mail, or to exchange traffic encryption session keys for use with conventional ciphers. In the latter case, of course, security will also depend on the strength of the chosen session cipher.

Terakey systems can be constructed using off the shelf electronic hardware components and relatively simple software. The rapid drop in the cost per gigabyte for mass storage, and for solid state flash storage in particular, helps make Terakey attractive.

Terakey also serves as a theoretical test case for evaluating quantum key distribution technology (QKD). Its session key exchange functionality parallels the capability of QKD, making Terakey a system for comparison, arguably offering equivalent benefits with lower cost and risk. Because Terakey's security derives from first principles, it is inherently resistant to cryptanalytic attack by quantum computers, a potential threat to existing cryptographic algorithms, for which solutions are still in development (U.S. National Security Agency, 2015).

Figure 2:
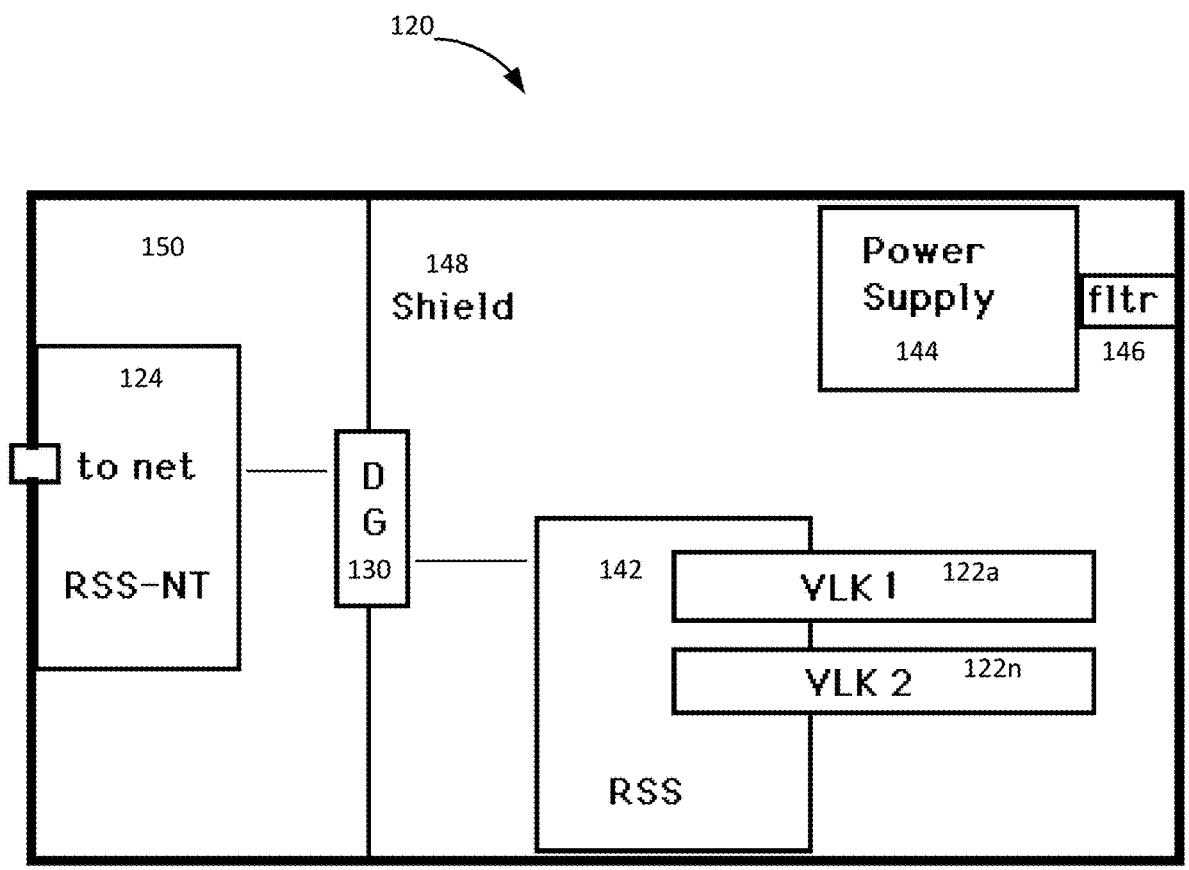
FIG. 2 is a schematic illustration of the restricted secret server (RSS) of FIG. 1A in accordance with one example embodiment disclosed herein.

FIG. 2 is a block diagram of the exemplary Restricted Secret Server (RSS) 120 (also referred to as Terakey storage unit) showing additional details. The RSS 120 includes two compartments 140 and 150. Compartment 150 includes the RSS-NI 124. Compartment 140 includes a housing 142 that can be locked, such as a metal safe, a separate power supply 144 and a filter 146. In one embodiment, an electromagnetic shield 148 disposed in compartment 140 separates the two compartments 140 and 150 electromagnetically and further shields the components within compartment 140. The compartments 140 and 150 preferably have separate power supplies. The power inputs to the power supplies pass through filters that attenuate any data signals exiting via the power lines. The RSS 120 includes a RSS processor (not shown), the VLK module(s) 122a-122n (collectively VLK module 122) and the RSS Network Interface 124. The RSS 120 further includes a Data Guard 130 which is disposed between compartments 140 and 150. The only data connection between compartments 140 and 150 is the Data Guard 130, which restricts and sanitizes the data passing between the RSS-NI 124 and compartment 140.

Data Guard

In one embodiment, physical security for the VLK module 122 is enhanced to follow the red/black concept suggested by the U.S. National Security Agency. The secret VLK data, considered red data, is enclosed in an electromagnetically shielded physical container such as a metal safe or a shielded compartment within a safe, or enclosed in some other Faraday cage shield. All signal connections pass through one or more special computing modules called Data Guards, that enforce message formats in both directions and restricts the rate at which information can leave the enclosure. The Data Guard may also apply an additional cryptographic hash to the output from the RSS 120 to further prevent information leakage. The Data Guard would ideally be a Harvard architecture processor, meaning that no data or code executed in the processor can affect its stored program. The Data Guard's firmware program is simple enough that it should not need updating, but if updating was needed, physical access to the module via opening the safe might be used for security, perhaps with two person integrity measures, such as dual locks as shown on the RSS 120 in FIGS. 1A and 1B.

Data Guard Operation

The function of the Data Guard 130 is to limit the amount of data coming out of the RSS 120 and to protect the RSS 120 from malware. The Data Guard 130 provides an interface between the MMM 110 and the RSS 120 itself. The Data Guard 130 is the only data connection for the RSS 120 in normal operation. The Data Guard 130 design treats both the MMM 110 and the RSS 120 as untrustworthy. Messages communicated through the Data Guard 130 are generally fixed in format and limited in length. Data Guard 130 can check a message authentication code (MAC). The Data Guard 130 discards messages that are invalid.

The Data Guard can optionally handle both encrypted and plaintext traffic in both directions between the MMM 110 and RSS 120 or there can be separate Data Guard 130 units for encrypted and for plaintext traffic, each communicating to separate black MMM2 110' and red MMM1 110, respectively. The multiple Data Guard 130 option might be appropriate where Red/Black separation is maintained, with separate Data Guards used for plaintext and ciphertext. The Data Guard 130 can optionally be potted to prevent software updates. If an update is necessary a new Data Guard 130 unit would be procured. The Data Guard 130 can use non-standard connectors, perhaps with more pins than necessary and scrambled proprietary wiring connections that could be checked by the Data Guard 130 and the units it is connected to. The Data Guard 130 can match outputs with requests, insuring no output passes to the MMM 110 unless a request with the same message ID and length had been sent to the RSS 120. For example it might maintain a table of message IDs from each request sent to the RSS 120 and only allow replies from the RSS 120 with a matching ID, after which that ID would be removed from the table, insuring that the ID was only replied to once.

The Data Guard 130 can further protect the VLK from leakage by limiting the rate at which messages received from the RSS 120 are retransmitted to a level consistent with message traffic rates. These rates could vary by time of day, day of week, holidays (e.g. Christmas season) or special events (e.g. a public report of a major data breach somewhere).

The Data Guard 130 might limit the frequency of alarm messages, or diagnostic or status requests to a rate low enough that no significant fraction of the VLK could be leaked by a malicious RSS 120 via such messages. A higher rate would be permitted when the diagnostic enable key switch or both switches, if there are two, is turned on.

The Data Guard 130 could be constructed in several ways including with a microprocessor, or integrated circuits such as a field-programmable gate arrays (FPGA), complex programmable logic devices (CPLD) or application specific integrated circuits (ASIC).

The operation of the Data Guard 130 in one embodiment is described by the following pseudo code:

//Data Guard pseudo code
Start: Wait for frame ready signal on input
Read Frame_length bits from input
Calculate Frame checksum
If checksum invalid go to start
If instruction code invalid go to start
Fill output frame buffer with messageID, instruction code, payload
Calculate new checksum
Insert checksum in output frame buffer
Raise frame ready signal on output
Transmit output frame buffer
Go to start The functions of the MMM 110, Data Guard 130 and RSS 120 are preferably performed in three separate computing devices for maximal security, but these functions could be combined in one or two computing devices, if other considerations, such as cost or throughput, are greater concerns.

Figure 3:
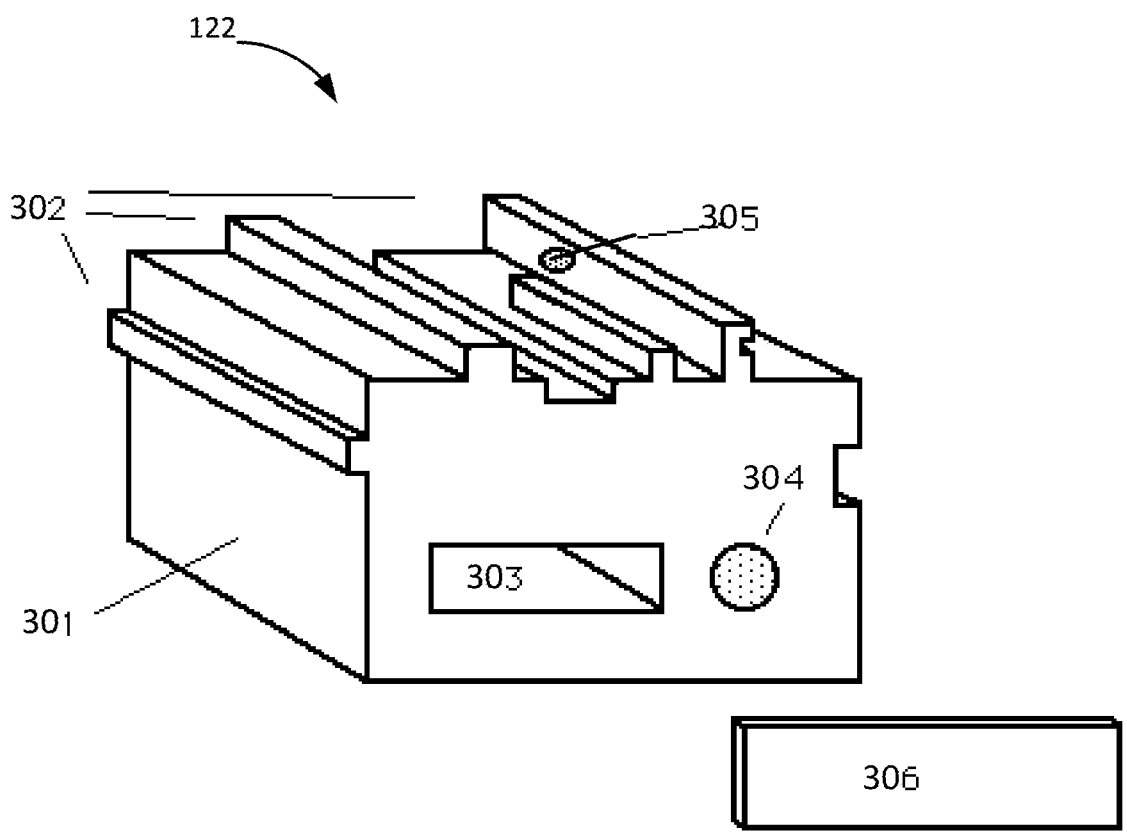
FIG. 3 is a schematic illustration of the very large key (VLK) module of FIG. 1A

Now referring to FIG. 3 an exemplary VLK module 122 includes an energy storage device 304 (e.g., a battery), several grooves and flutes 302, a cavity 303 for receiving a memory module (not shown), a cover 306 and an optional optical sensor 305. The grooves and flutes 302 are designed to fit in a corresponding mating receptacle in the RSS 120. The cavity in the module houses a memory module and possibly an alarm microprocessor to detect removal or tampering and take preventive measures such as erasing the memory modules. The grooves and flutes 302 can also prevent insertion of an unauthorized VLK 122 module into the RSS 120. In one embodiment, the VLK module 122 is made from a strong material such as aluminum, steel or plastic. The energy source 304 is included to give the alarm processor time to act after removal of external power. The VLK module 122 has interlock features that the receptacle interfaces with to allow a RSS processor and/or a processor in the VLK module 122 to detect the modules removal. For example, the optical sensor 305 might be mounted in a groove on flute 302. A cover 306 securely closes the cavity 303 and a battery compartment so that unauthorized access to them is delayed long enough to allow the alarm processor to act. The cover 306 might be welded on or glued on or attached with tamper resistant fasteners and might incorporate radio frequency gaskets to prevent signal leakage.

Figure 4:
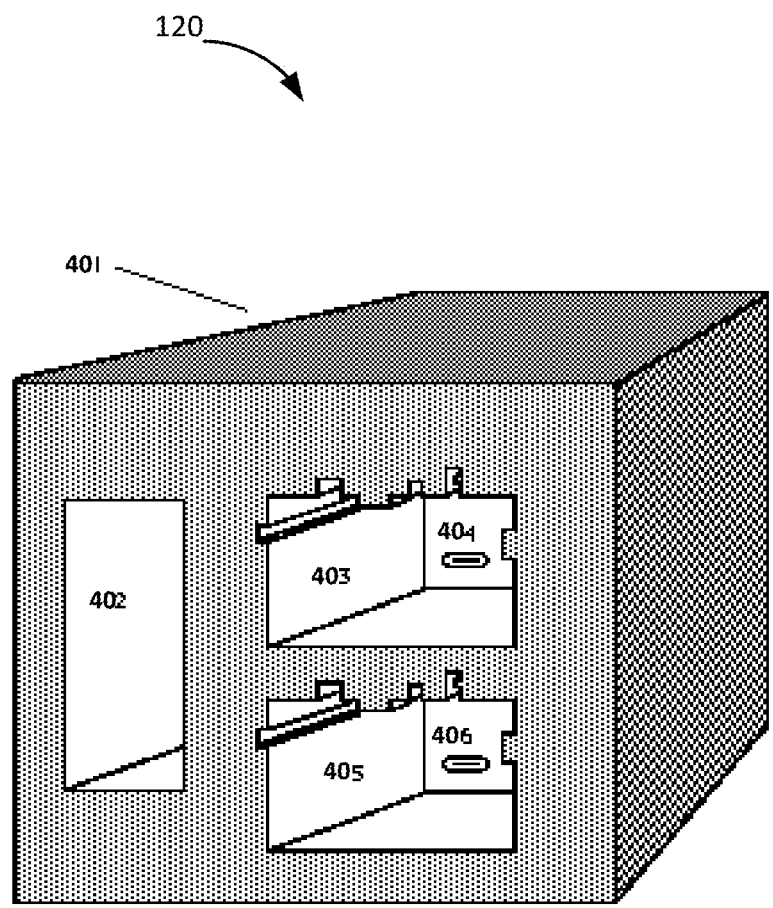
FIG. 4 is a schematic illustration of an RSS enclosure housing the RSS of FIG. 2.

FIG. 4 shows an exemplary RSS enclosure 401. Two receptacles 403 and 405 for VLK modules 122 are provided in this example. Each receptacle is mechanically keyed with flutes and receptacles 403 and 405 (e.g., grooves) to match the mechanical keying grooves and flutes 302 on the VLK module 122. For added security the pattern of grooves and flutes and connector wiring can be customized for each enterprise customer, so that a VLK stolen from one customer cannot be easily read on another customer's RSS 120. Each receptacle 403 and 405 includes connectors 404 and 406, respectively, that the VLK module 122 plugs into for signals and power. Compartment 402 houses the RSS processor (not shown).

Physical Security

The design of VLK 122 makes threats mounted from actors external to the organization, i.e. with no physical access to the equipment, very difficult if not impossible. However the VLK 122 itself becomes a valuable, concentrated target and should receive physical protection above simply being inside a restricted and guarded server room. Because there is no need for routine physical access to the restricted secret server, it can be locked in a secure container, such as a safe. Safes are available commercially that meet U.S. General Services Administration specifications for classified material. Some models include two combinations to support two-person-integrity (TPI) rules. Models designed to hold electronic equipment are available. Such safes offer around 20-hour resistance to manipulation of the dial access by attackers. They therefore would be supplemented with tamper alarms and video surveillance. Because of their weight, they might be mounted at the bottom of an equipment rack or bolted to the floor.

Existing data centers generally have security systems including perimeter alarms and video surveillance with digital video recorders (DVRs). The restricted secret enclosures would tie into those systems with tamper alarms on the enclosures, which might also have dedicated cameras watching them. DVRs typically have alarm inputs that can tag video associated with an alarm event and even send the video to a remote monitoring station. They can also detect motion in a secured area and signal an alarm. Logs of authorized access to the VLK system might be maintained on paper forms to prevent digital tampering. Backup copies of the VLK 122 might be stored in a vault, perhaps in a secure container with dual padlocks.

An all metal safe could serve as a heat sink, allowing higher power burst operation during peak times. If necessary, heat exchanger fins for thermal dissipation could be mounted on outside of the safe, perhaps with cold aisle exposure for data center that segregate hot and cold airflows.

Other security measures could include:

Tamper evident seals on backup VLK modules and their connectors in storage, (e.g. Evidence bags);

Detection of attempts to manipulate the safe combination dial or dials without authorization;

Creation of a no-lone-zone perimeter around the RSS 120 with motion detection; a person acting alone within the zone would trigger an alarm;

Using a DC power supply 144 with a low pass filter 146 at the input to the RSS 120; Using dual power supplies for reliability and to allow hot-swap of the power supply;

Separate filtered power for the Data Guard;

Using optical fiber data links into the RSS-NI 124 and other communication links in the system to prevent Tempest leakage over signal wires; and Using laser power sources or compressed air with a turbine, to supply power to the RSS and VLK, thereby eliminating electrical power wiring that can allow data leaks. If both fiber optic communication links and fiber optic power are used, with both power and signal fibers routed through small holes or channels to take advantage of the waveguide cutoff effect, and proper radio frequency gasketing measures are taken around doors and access covers, leakage of side channel signal from the RSS 120 and VLK 122 can be practically eliminated.

Two-person-integrity could be enforced by having two locks on the cabinet and two key switches for diagnostic mode. Alternately one key switch and a remote signal, perhaps cryptographically signed, could suffice, for situations where the staffing level at the data center is low.

Figure 5:
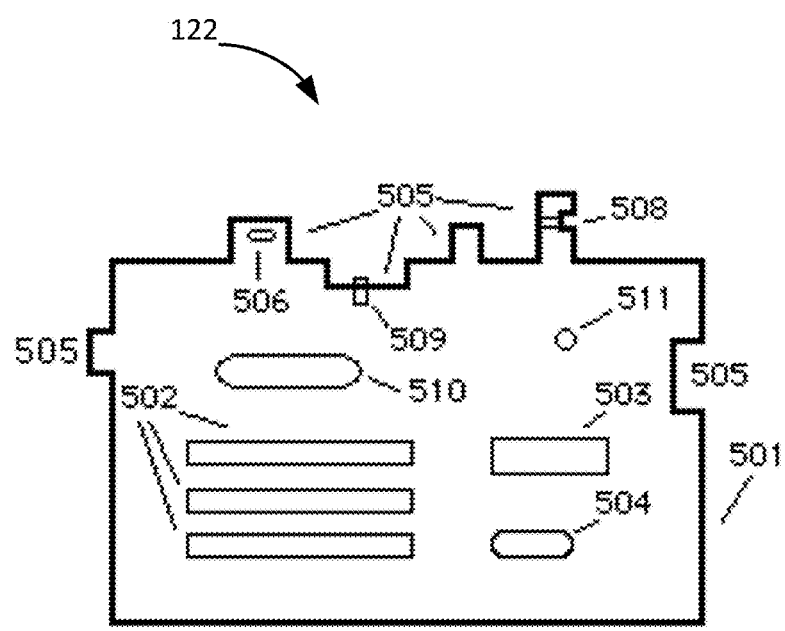
FIG. 5 is a schematic illustration of the VLK module of FIG. 1A.

Several additional components can be included in VLK module 122. In addition to the memory modules 502 (at least one should be present) and an electrical connector 510 to supply power for the memory module and to provide signal lines for communication with the RSS processor. The other elements in FIG. 5 enhance security and the exact combination, including the possibility of more than one of each element, would be chosen based on cost, security and reliability considerations. These elements include an alarm processor 503, an energy storage device 504, grooves and flutes 505, a magnetic or proximity switch 506, a hole to allow a sensor's light to pass through 508, a switch that is depressed when the module is inserted into the receptacle 509 and a status indicator light 511.

There are several options for the VLK module 122. One purpose of the VLK module 122 is to make surreptitious exfiltration of the security secret infeasible. As such it should include enough data so that only a large physical medium can hold it and to require long time to copy its content. Some levels of physical security might include insuring that the memory modules are big enough so they cannot be exfiltrated in a briefcase, shirt pocket, and other articles of clothing, service animal or a body cavity.

Options for storage in the VLK include:

Solid State Drives:

With present technology, the preferred medium for the VLK is solid state NAND flash memory. Solid state drives (SSDs) use NAND flash memory technology and error-correcting codes for reliability. Random access times are good, but NAND flash is organized as a block transfer device. Blocks are in turn subdivided into pages, typically 4K Bytes. The RSS 120 allows for this limitation. There is no requirement for writing to the memory after VLK creation, which eliminates most the write-wear problem associated with flash memory. The only additional writes are likely to come from built-in error correction. Some SSD's will rewrite data blocks after detecting a correctable error. The impact of such occasional writes in this setting is likely small, but needs to be evaluated. It might be necessary to replace the SSD modules every few years. An alternative might be employing deeper error-correcting codes that can fix more errors.

Many SSD memory devices have a built-in drive encryption feature. This feature can be used as a VLK emergency erase mechanism. The built-in drive encryption software could be configured to erase the data encryption key if tapering is detected severe enough to indicate a security breach, for example opening the safe door or removal of a VLK module 122 without a separate authorization signal.

Some SSD drives implement a Secure Erase command that might also be used. In some models this feature is implemented by applying a higher voltage to the NAND flash to reset all its bits in parallel. The VLK module 122 could include a source of energy 304, such as a backup battery or super capacitor, to ensure enough electrical energy is available to carry out the erasure. Direct physical destruction techniques such as Thermite or corrosive substances could be used to destroy the memory modules, though the safety considerations might outweigh the security advantage.

Solid state drives include a microprocessor control device. It might be advantageous to customize the firmware in the device for VLK module 122 use. Doing this might allow an automatic erase on tamper detection capability, for example. There may be performance optimizations such as queuing that are possible for the specific nature of VLK module 122 data requirements. Also the memory device control command codes might be changed from the standard commands to a proprietary version so that off the shelf software would not be able to access the VLK module's 122 solid state drives. While this is a form of "security by obscurity," it would still be a useful part of defense in depth.

Rotating Hard Disk:

Rotating hard disk drives currently offer the lowest cost per gigabyte of storage, but they are not well suited for random access, limited by substantial delays for arm movement and rotation latency. They are also block organized. If a rotating hard disk is used to store the VLK, access requests could be batched and sorted into the order they appear as the disk rotates, to minimize access time.

Nor Flash:

NOR flash offers direct random access to any byte, but it is significantly more expensive per bit than NAND flash. NOR flash is otherwise suitable for storing the VLK.

Solid State RAM:

DRAM and SRAM offer very fast random access, but are relatively expensive and generally require a constant power source to retain data long term. This power can be provided by battery backup or super capacitors. Using DRAM or SRAM for VLK or working storage would allow physical security measures that detect tampering to cause the memory to lose power, erasing or at least degrading its content.

New Memory Technologies:

New memory technologies, such as ferroelectric RAM and memory resistors, are promising, but still very expensive per bit. Other technologies under development may also be suitable.

Non-Clone-Able Memory Devices:

While non-clone-able memory has security advantages, customers are likely to demand multiple RSS 120 devices for reliability and backup.

In another embodiment, the VLK module 122 can include storage which has a memory device including a control processor having non-standard firmware such that said memory device's control commands differ from standard control commands of a corresponding standard memory. In another embodiment, firmware used for different customers might have different control commands. In case the VLK module 122 is compromised, the use of non-standard firmware might reduce the chance that the unpredictable data block/VLK is removed from the VLK module 122 or that an unauthorized VLK is substituted for the trusted VLK.

Security Limitations

In Terakey's basic form, there is a risk of occasional bytes of information being compromised. A central assumption for the security proof of one-time pads is that key must never be reused. Terakey does not include a mechanism to completely prevent reuse, but instead limits reuse stochastically. The risk of key byte reuse increases as the ratio of traffic sent to the size of the Terakey. By keeping the quantity of key high compared to the volume of traffic, key byte reuse will be infrequent.

There are several possible ways to deal with the impact of this sporadic byte leakage:

Living With the Risk:

In some applications an adversary occasionally knowing a byte or two in a message may not be that damaging. For example, in symmetric key exchange, an adversary may not benefit much from knowing a byte or two of a 256-bit key.

If a Terakey is used exclusively for key exchange, discovering byte reuse requires the attacker to recover a large fraction of the session keys used to encrypt previous messages. This is difficult even if all pervious message plaintexts are known, so the risk of even occasional key byte compromise would be low in practice. The risk of even occasional byte compromise could be further remediated by using Terakey to generate a larger pre-key nonce that is hashed upon receipt to produce the session key.

Using more than one round of Terakey, which greatly reduces the probability of leakage, as described below. Using classical techniques, such as random message padding or message splitting, to obscure the occasional leak.

Using a modern cryptographic pseudorandom number generator to shield the key-byte selection process. This last approach is simple and natural to do, but the resulting protection against byte leaks is not proved from first principle. However, the security assumptions for the cryptographic tools used for this purpose can be less stringent than for conventional usage. Recovering the state of a cryptographic pseudo-random number generator from occasional bytes of output is presumably much harder that recovering the state if all previous output is known, which is the normal security test.

Terakey is a third encryption category, different from the categories described above, that employs a secret key that is much larger than the plaintext. At first glance this seems pointless. If the one-time pad offers complete security with a key no longer than the plaintext, why use a much larger key?

The answer is to fix a major shortcoming of OTP. For full security, no portion of a key can ever be used twice. This means that each party using OTP must keep careful records of which sections of the key have been used. When only two stations are communicating this is burdensome enough. But when multiple stations wish to communicate with each other directly, without going through a central relay station, the bookkeeping requirements quickly become unmanageable. The number of station pairs, and hence the number of sets of keys to be managed, increases as the square of the number of stations.

Terakey eliminates the need to manage numerous pads. The primary trade-off is security that can degrade slowly as the volume of traffic increases, but in a quantifiable and manageable way. Assuming an adversary has accurate copies of ciphertext from previous transmissions and all details of the encryption are known except for the Terakey itself, there is a small probability that the adversary can recover some information about an occasional byte in a message. Typically, this would be the xor of the two bytes (depth 2). Higher depth leaks are possible but much rarer. If the adversary knows or can guess the plaintext of one of the messages, they can read the corresponding character in a new message. The probability of such a byte leak increases gradually with the amount of traffic encrypted using a given Terakey. However, the probability can be made small in practical circumstances. Terakey can be combined with a conventional cipher in several ways to eliminate this small risk. When combined in this manner, protection against even small leaks is at least as secure as the chosen cipher and only depends on a more relaxed security model for that cipher. Classical techniques, such as padding and message folding, can also be employed to reduce the risk.

Encryption

Figure 6:
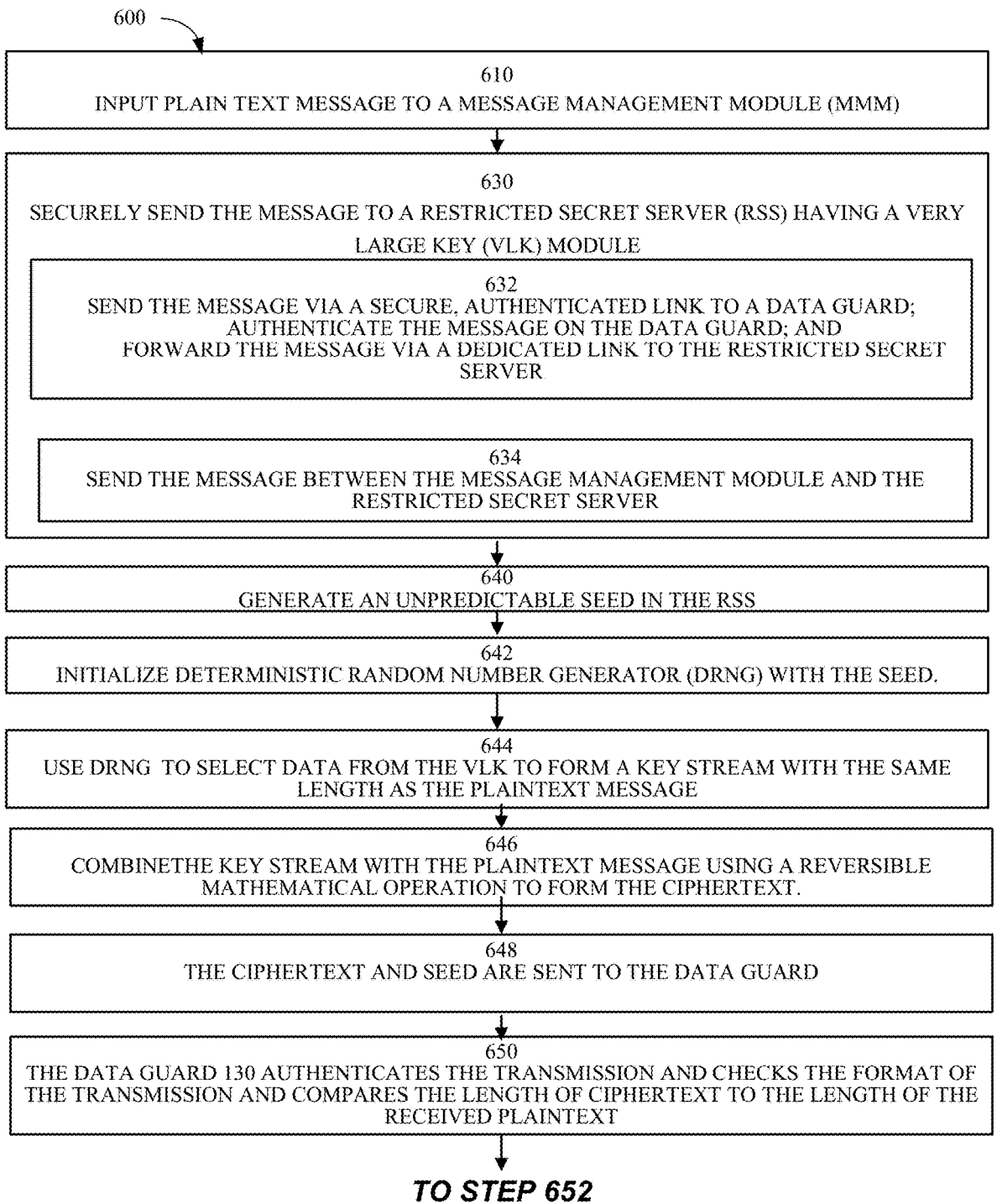
FIG. 6 is a flow chart of processing steps performed to encrypt data in accordance with embodiments disclosed herein.

In FIG. 6, flowchart 600 diagrams the overall process of encryption. In step 610, a plaintext message is input to a message management module (MMM) 110. In step 630, the message is securely sent to a restricted secret server (RSS) 120 having a very large key (VLK) module 122. In one embodiment in step 632, the message is sent via a secure, authenticated link to the Data Guard 130, authenticated on the Data Guard 130 and forwarded via a dedicated link to the restricted secret server 120. In step 634 in another embodiment, the message between the message management module and the restricted secret server is optionally sent fixed in size to prevent buffer overflow attacks. In step 640, an unpredictable seed is generated in the RSS.

In step 642, the deterministic random number generator (DRNG) is initialized with the seed.

In step 644, the DRNG is used to select data from the VLK to form a key stream with the same length as the plaintext message.

In step 646, the key stream is combined with the plaintext message using a reversible mathematical operation to form the ciphertext. In step 648, the ciphertext and seed are sent to the Data Guard 130. In step 650, the Data Guard 130 authenticates the transmission and checks the format of the transmission and compares the length of ciphertext to the length of the received plaintext.

Figure 7:
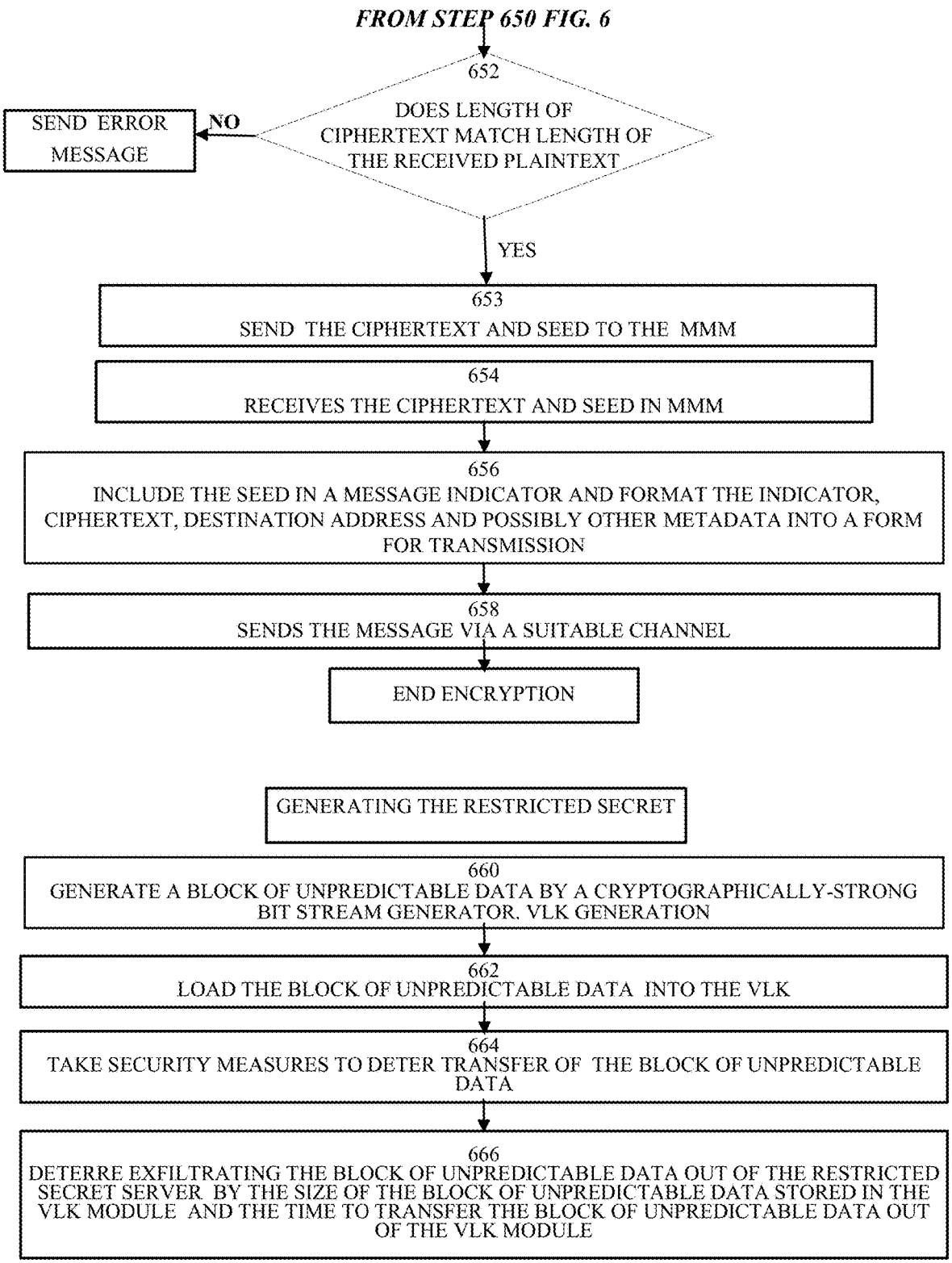
FIG. 7 is a flow chart of processing steps performed to encrypt data in accordance with embodiments disclosed herein.

Now referring to FIG. 7, the encryption process continues in step 652 if the lengths match, the ciphertext and seed are sent to the MMM in step 653. If they do not match, an error message is sent. In step 654, the MMM receives the ciphertext and seed. In step 656, the MMM includes the seed in a message indicator and formats the indicator, ciphertext, destination address and possibly other metadata into a form for transmission. In step 658, the MMM sends the message via a suitable channel. The return message can also be sent fixed in size.

Generating the Restricted Secret:

The VLK module 122 can be filled with generated key bytes or bits that are close to statistically independent and uniformly distributed and should be unpredictable. This normally only needs to be done once for each VLK. The VLK modules 122 s at each station in a communication network protected by Terakey should have the same restricted secret. So the restricted secret typically only needs to be generated once in the service life of one edition of Terakey, also known as a cryptoperiod, and physical copies distributed to each station in the network. An alternative VLK can be generated and distributed to each station in case the primary Terakey is compromised. VLK generation can be accomplished several ways. Several methods for generating this data include:

Using a True Random Bit Source:

In this approach all the bits needed for a VLK restricted secret are generated by a hardware random number generator. One possible source of random bits is a video digitizer connected to a wide-band noise source. One terabyte of storage can hold about 4 hours of video at 720p resolution, so this would be a good approximation of the speed at which a VLK module 122 could be filled.

Using a Combined Source:

The VLK restricted secret can be generated by a DRNG that is periodically reseeded from a true random bit generator. For example, Intel's built-in random number generator combines a deterministic RNG with periodic reseeds from a true entropy source. Intel claims its entropy source produces 3 gigabits per second and its read random (RDrand) instruction can achieve 800 MB/s with multiple threads. As another example, well-known techniques such as Yarrow and Fortuna could be used to periodically add entropy from a true random bit source to a pseudo-random bit generator to generate a VLK restricted secret.

Randomly Seeded DRNG (per NIST SP 800-90):

Another approach to generating a VLK restricted secret is to use a deterministic random number generator that is seeded with a short secret key, say of 256 bits. The short secret key could be destroyed after use or it could be recorded, perhaps in a paper document. If recorded it could serve as an emergency backup, allowing the VLK restricted secret to be regenerated. Of course, the short secret key would have to be closely guarded. The short secret key could be generated using a M out of N secret sharing technique that would require M separate key holders out of a total of N key holders to agree to reconstruct the VLK.

Good software implementations of AES run at about 15 clock cycles per byte. (https://cr.yp.to/aes-speed.html) On Intel Core and AMD FX CPUs supporting the AES-NI instruction set extensions, throughput can be over 700 MB/s per thread.

Ceremony:

Production or copying of the VLK might involve a ceremony with one or more witnesses, possibly recorded on video, following a specific script. Given the length of time required, the desired operation might be set up and initiated, then sealed in a safe and left over night or however long it is estimated to take. Video surveillance with motion detection and/or human guards could protect the safe while the operation completes. Several copies of the VLK might be made in parallel to support multiple RSS 120 devices and for back up. These could be compared and a whole disk hash obtained. Drive encryption keys could be generated and loaded as part of the ceremony. Tests to insure quality might be applied.

Generating the Restricted Secret

Referring again to FIG. 7 In step 660, a block of unpredictable data is generated by a cryptographically-strong bit stream generator.

In step 662, the block of unpredictable data is loaded into the VLK module 122. It is understood that in some embodiments this need only be done one time per crypto period or whenever necessary for security reasons. In step 664, security measures are taken to deter transfer of the block of unpredictable data out of the VLK module 122 by adjusting the process block size and transfer speed (e.g., the transfer could take longer than ten minutes by virtue of the size of the block and the transfer speed). As indicated below this is a security measure as described below in conjunction with the operation of the Data Guard 130 and the configuration of the VLK module 122 storage.

In step 666, exfiltrating the block of unpredictable data out of the restricted secret server is deterred by the size of the block of unpredictable data stored in the VLK module 122 and the time to transfer the block of unpredictable data out of the VLK module 122. It if further understood that steps 664 and 666 are for security purposes and indicate the operation of the VLK module 122 with respect to data transfers and that these steps along with steps 660 and 662 are not generally part of the encryption or decryption process.

Decryption

Referring now to FIG. 8, a flowchart 800 diagrams a decryption process. In step 810, a ciphertext message with message indicator (described above) is input to a message management module (MMM) 110. In step 812, the ciphertext message with message indicator is sent to the Data Guard. In step 814, the Data Guard validates the transmission and sends the ciphertext message with message indicator to the RSS. In step 816, the deterministic random number generator (DRNG) is initialized with the seed from the message indicator. In step 820, the DRNG is used to select data from the VLK to form a key stream with the same length as the plaintext message. The RNG seed is derived from a message indicator in the message metadata. It could be the indicator itself or a portion of the indicator. In step 830, the RSS combines the key stream with the ciphertext message using a reversible mathematical operation to form the plaintext.

In step 840, the plaintext is sent to the Data Guard 130. In step 850, the Data Guard 130 authenticates the transmission and checks the format of the transmission and compares the length of plaintext to the length of the previous ciphertext. In step 860, the Data Guard 130 transmits the plaintext to the MMM. In step 870 the MMM transmits the plaintext and header information to the intended recipient via a secure channel.

Description of Terakey

Terakey can be described in a series of versions or levels, starting with the most basic, which illustrates the byte collision problem, and then other versions that address the byte collision problem in various ways.

Basic Terakey Consists of Three Major Elements:
1. A large master key string, K of length L bytes, the Terakey. Bytes are usually octets, for ease of use with common hardware, but could be any fixed number of bits. L is assumed to be much larger than the typical network traffic volume during the time K is in effect: gigabyte, terabyte or even petabyte keys might be appropriate.
2. A method for assigning each message a unique message indicator v, perhaps determined by a nonce, by hashing the message, by hashing just its header, from a prearranged list, or communicated using a separate mechanism, such as public key cryptography.
3. A deterministic pseudorandom number generator function, R(v, n), whose output ranges from 0 to L−1. The message indicator v is used as the control variable, or seed, for R, i.e. R produces different pseudorandom sequences for different v. The variable n indexes the bytes in the pseudorandom sequence produced by R. The index n starts at 0 for each new message.

To understand its strengths and limitations, Terakey will be described in a series of levels. For full security, a higher level would be used, and possibly other measures added, however, to analyze its properties, start with the simplest models. For the security analysis, it is assumed that an attacker knows all the design details of Terakey. For now, it is further assumed that any attacker also knows both R and v, can infer n, but does not know K Terakey Basic In Terakey basic, the $n^{th}$ plaintext byte of a message, P(n), is converted to ciphertext by the formula C(n)=P(n) o K(R(v, n)), where v is the message indicator and o is a reversible operation such as bit-wise exclusive-or (xor) or modular addition. For decryption, P(n)=K(R(v, n)) o' C(n), where o' is the inverse of o. (For xor, o' is the same as o.)

Byte—a byte is typically an octet, but can be a binary field of any length;

K is a very large array of bytes that are generated by a random or pseudo-random process;

P is a string of bytes that is the plaintext;

C is a string of bytes that is the cipher text;

n is an index variable, so P (n) is the nth byte in P;

o is a reversible operation that combines two bytes to form a third byte;

o' is the inverse operation to o, i.e. o followed by o' leaves a byte unchanged;

R is a deterministic pseudo-random number generator;
v is a message indicator which serves a seed to the pseudo-random number generator; and
R(v, n) is the nth byte output from R when it is initialized by v.

If an attacker knows the plaintext and cipher test of previous messages, then he can recover the Terakey bytes that were used to encrypt those messages. If a new message happens to use one of those recovered key bytes in the kth position, then kth byte of the new message will be compromised, a collision.

Let M be the total number of bytes of message plaintext that has been obtained by an adversary (worst case, the total amount of traffic that has been sent to date on the network using the current K). Let f=M/L be the relative amount, i.e. the fraction of the Terakey that has been used. Then if M<<L, the probability that a byte in a new message can be read by an attacker is f. For example, if L=$10^{12}$ (1 TB) and M=4 GB, then f=0.004. So, in a 1000-byte message, an average of 4 bytes will be potentially compromised.

Even if an attacker does not know the plaintexts of past traffic, he may, under the basic assumptions, be able to discover instances where the same key byte was used to encrypt two different plaintext bytes, p1 and p2. The attacker will then know the value of the operation o' applied to the two plaintext bytes: (p1 o k) o' (p2 o k)=p1 o' p2.

Any message byte encrypted by a Terakey byte that has never been used on the network is secure, however a byte that is secure when sent can be compromised by future traffic. Terakey basic is imperfect, but is strengths and weaknesses are completely characterized from first principles. The goal is to build on basic's strengths and minimize its weaknesses.

As a practical matter, it may be difficult for an adversary to accumulate a substantial fraction of the plaintext traffic on a network, but it is generally unwise to base security on such an assumption, as the massive leak of classified U.S. diplomatic cables to Wikileaks in 2010 demonstrates. Note, however, that when Terakey is used only for key exchange, for an adversary to mount a "known plaintext attack" means knowing the traffic key used to encrypt each message sent. Knowing just the plaintext of the messages themselves does not enable detecting possible collisions.

Terakey Doubled

The likelihood of a byte disclosure can be sharply reduced be using two Terakey bytes to encrypt each plaintext byte. The nth plaintext byte P(n) is converted to ciphertext by the formula:

$$C(n)=P(n) o\ K(R(2n)) o\ K(R(2n+1))$$

(Here the message indicator/seed parameter v in R is omitted for clarity.) An adversary who knows C(n) and P(n) only learns K(R(2n)) o K(R(2n+1)). Assuming f is small, the probability of adversary encountering K(R(2n)) o K(R(2n+1)) in the encryption of another cipher byte is roughly the square of 2f.

With Terakey doubled there are, however, other situations where a new cipherbyte can be compromised. Suppose an attacker, who it is still assumed knows past traffic and how the bytes of K are selected, has recovered in the past messages containing the first two cipherbyte pairs below, and therefore knows C1, C2, P1, P2, K(R(a)) o K(R(b)), and K(R(b)) o K(R(c)).

$$C1=P1\ o\ K(R(a)) o\ K(R(b))$$

$$C2=P2\ o\ K(R(b)) o\ K(R(c))$$

The attacker now intercepts a new secret message $$C3=P3\ o\ K(R(a)) o\ K(R(c))$$

and therefore, knows C3, and that R(a) and R(b) are being used to encipher P3. She can then recover P3 by computing $$(K(R(a)) o\ K(R(b))) o (K(R(b)) o\ K(R(c)))=K(R(a)) o\ K(R(c))$$

Note that this scenario involves three coincidences, one for C2 and two for C3, and so its likelihood is on the order of $f^3$ for small f. Longer chains are also possible but even less likely.

Again, assume L=$10^{12}$ (1 TB) and M=4 GB, Then f=0.004 and $(2f)^2$=6.4*$10^{-5}$. So, in a 1000-byte message the probability of one byte being compromised is 6.4*$10^{-2}$.

The penalty, of course, is roughly doubling the time required to extract the plaintext or traffic key from the master key file and touching twice as many key bytes per message.

Terakey m-Level

The likelihood of a byte disclosure can be further reduced be using more than two key bytes per plaintext bytes. In level m, the nth plaintext byte P(n) is converted to ciphertext by the formula:

$$C(n)=P(n) o\ K(R(2n)) o\ K(R(mn+1)) o \ldots o\ K(R(mn+m-1))$$

Again, if f is small, then the probability compromised bytes at level m is on the order of $(mf)^{-m}$.

Terakey Indirect: Use One Key Byte to Help Select the Next

Another way likelihood of a byte disclosure can be sharply reduced using two Terakey bytes to encrypt each plaintext byte is to use one byte to help select the second bye. The nth plaintext byte P(n) is converted to ciphertext by the formula:

$$C(n)=P(n) o\ K((R(2n)+K(R(2n+1)) \bmod L)$$

$$C(n)=P(n) o\ K((R(n)+K(R(n)) \bmod L)$$

If the Terakey is stored in SSD the performance impact of this indirection is minimal since K((R(n)+K(R(n))mod L) is likely to be on the same SSD page as K(R(n)).

Note that it is necessary to insure two people with different message IDs get different effect of indirect access Terakey SKRNG: Use a Secretly Keyed Strong Random Number Generator for R In the analysis of Terakey security, it is assumed that the algorithm R, its seed and therefore its outputs are known to an attacker. This is done to analyze the byte leak phenomenon under worst-case conditions. In practice there is no reason to expose the state and output of R to potential attackers. A keyed cryptographic random number generator can be used for R, and seed it in one of a variety of ways:

1. Instead of using a message indicator to seed R, that value is used to look up a string in K and then use that secret string to seed R. This might be done using the basic approach, that is first using the message indicator to seed R, then using R to select enough bytes to reseed R.
2. Separately provide a secret list of seeds for R changed daily or at some other crypto period. If the seeds are destroyed after use, the damage from an attacker capturing K would be limited
3. Use public key cryptography to exchange seeds for R on a per message basis. This would allow Terakey to benefit from the forward security properties of the public key system.
4. Of course, a combination of the above methods could be used.

Additional measurers to deal with byte leaks
Below are several additional ways to deal with byte leaks:
Using Terakey Exclusively to Exchange Session Keys As pointed out above, another use case where occasional byte leaks might be acceptable is when Terakey is used to exchange session cipher keys. Knowing one byte in a cipher key reduces the strength of, say, a 256-bit key to 248 bits, which is still strong. And again, if a Terakey is only used to exchange cipher keys, a byte collision attack on a Terakey requires an attacker recovering a substantial fraction of the session cipher keys, not just the messages sent on those keys. This is a much more challenging task, even if all message plaintexts sent to date are known, as it requires breaking the cipher to recover for a large fraction of messages.

Furthermore, the volume of traffic when only cipher keys are exchanged would be much lower. A 256-bit key is only 32 bytes long; a 128-bit key is only 16 bytes. A station generating one new 256-bit key per second would consume just over one gigabyte of Terakey per year. Restricting Terakey to exchanging session keys also reduces the likelihood of byte leaks. In the example given for basic Terakey above where $L=10^{12}$ (1 TB) and $M=4$ GB (four years at one session key per second, all session keys recovered by the adversary), then $f=0.004$. and the probability of a single byte leak in a 256-bit key (32-bytes) would be 0.128.

The strength of an ideal symmetric cipher with an N-bit key under attack by an ideal quantum computer using Grover's algorithm is $\sim 2^{N/2}$. Thus an 8-bit key compromise would reduce the effective strength of the key by 4 bits.

If any material risk of leaking bytes from session keys is considered unacceptable, Terakey could be used to create a string longer than the required cipher key with that string then hashed to form the traffic key. This would further reduce the value of knowing even a few bytes of the pre-key string.
Change K Periodically
Changing K periodically helps keep f small. A new K can be supplied regularly, or K can be stirred periodically using some pseudo random function, perhaps keyed from K or from a fresh data set, such as a CD- or DVD-ROM delivered to each site, or both. Backup Terakeys can be kept on hand allow a fresh K to be employed in a crisis.
Pre-Encrypt the Message Using a Standard Cipher
Security becomes provable using assumptions that are much more relaxed than normal security assumptions for the cipher alone and may be fully provable. For example, if $f'''$ is low enough so that the probability of more than a single byte leak is low, then pre-encrypting the message with a Caesar cipher with a random shift selected from K should eliminate any information from a single byte leak.
Use Random Padding or Folding
Random padding or folding makes it difficult for an adversary to compare positions.
Super-Encryption
Messages can be conventionally encrypted before encryption by Terakey, or the Terakey-encrypted message ciphertext can be super-encrypted by conventional cryptographic means.
Compress Messages
Compressing messages prior to Terakey encryption can make symbols more equally likely to occur. The combining the function, o, can be derived by table lookup, with the table recalculated periodically from K.
Indicator Security When encrypting messages, the indicator should be generated automatically by secure hardware of software, such as the module where encryption is taking place. This prevents possible attacks where an insider generates a message with an indicator crafted to reveal certain Terakey bytes when used as a seed.
Authentication Terakey is a stream cipher and therefore subject to malleability attacks. Someone who knows the content of a message in transit can alter the message so that it decrypts to an altered form. Random padding or folding complicates such attacks. Standard cryptographic techniques such as message authentication codes (MACs) can be employed, potentially using the Terakey to supply the needed shared secret.
Forward Security Because destruction of a Terakey can be difficult, there is a risk of the key being compromised by a physical attack. To mitigate this risk, an adversary who recovers the Terakey should not be able to decode past messages encrypted using that edition of the Terakey. One way to accomplish this, as pointed out above, it to exchange message id using public key cryptography algorithms that have forward security. But the security of this approach relies on the presumed security of the public key algorithm employed. This may suffice to cover the physical attack contingency. More secure, though more cumbersome alternatives exist to achieve Terakey forward security.

The traditional approach for one-time pads is to destroy each coding sheet after use. The analog in Terakey is to erase each Terakey byte once it is used. Doing this ensures forward security (up to the ability of the Terakey storage device to securely erase bytes) but can present transmission reliability problems. Fortunately, there are a couple of ways to address such problems.

The problem is that each station in a decentralized Terakey network that erases used bytes will, in general, erase a different set of key bytes. As a result, if a sending station uses a byte that the receiving station has erased, that byte will be garbled in the received text. One way to deal with such errors is to use error correcting codes, which can be designed to detect and correct single byte or multiple byte errors.

The use case where Terakey is employed to exchange traffic encryption session keys for conventional ciphers requires additional consideration. Adding error correcting code bits could aid an attacker in recovering the session key. One way to mitigate this risk is to send more bytes than the session key length, hashing those bytes to create the session key. The number of additional bytes would be chosen to offset the information provided by the error correction bits.

A perhaps simpler approach is possible assuming the receiver has some way to detect an invalid encryption, say by a garbled message header, a bad checksum or authenticator. Assuming used bytes are erased by zeroing them out, the receiver on detecting a bad decrypt could look for zero bytes in the putative session key and try all possible substitutions. If there were more than one zero byte it could try each in turn, on the assumption that only one of the zero bytes was an erasure, then try all pairs, and so on. Given the speed of modern processor, the delay in recovering session keys that include on, two or even three erasures is modest.

Sending stations could check a list of erased bytes and avoid issuing a session key that contains an erased byte, say by selecting a different message identifier. But they cannot guarantee that a receiving station has not erased one of the bytes selected.

Erasing individual bytes requires consideration of the properties of different storage media. Static and dynamic RAM, rotating magnetic media, solid state drives (NAND) and new memory technology being developed.

Logistics

A Terakey can be stored on a single hard drive, multiple hard drives, RAID array, one or more solid state drives, SD card, USB drives, CD, DVD, or Blu-ray optical store, or any other random-access electronic storage medium.

Keys can be transported disguised as audio CDs or in mobile devices, such as smart phones, music players or tablets.

Terakey users in a network could track the quantity of Terakey used and periodically report approximate volume to a central point to establish the fraction f of Terakey that has been used and the rate at which it is being used. Replenishment of the Terakey can be based on this report.

Terakey can be updated by sending a fresh Terakey, which can be used as is or combined with the existing Terakey using the xor function or a more complex algorithm. The new key might be placed in service when all stations confirm successful update.

Terakey can be housed in sealed box with, say, optically coupled I/O with limited bandwidth. Power can be supplied through compressed air via a labyrinthine metal tube (same for exhaust). This eliminates any compromising emanations and limits the ability of anyone to extract K. A Data Guard™ can be used to limit access to K.

A set of Terakeys for a long time period can be stored in tamper-evident packages.

Two or more Terakeys can be generated separately, sent via separate channels, e.g. two couriers, and combined on arrival. Or the Terakey cipher can be modified to require a byte from each version and combine them.

Key Generation

The full security proof for Terakey assumes that the entire Terakey is random. Creating a Terakey therefore requires large quantities of fully random data. While the needed engineering is not trivial, this article assumes it is possible to generate enough such data of sufficient quality to assure security.

As a practical matter, a combination of a wide-band random data source and data whitening techniques could be used. Intermediate solutions that rely on cryptographic primitives, such as ciphers and hashes, seeded with sufficient entropy can be used to generate a Terakey, as suggested in NIST SP800-90, gaining the benefit of heavyweight encryption, but without the first-principles Terakey security proof.

High speed video digitizers with 12 to 14 bit resolution and speeds over 200 million samples per second are commercially available, as are calibrated broadband noise sources. A noise source constructed from readily available components may be suitable if it is desired to minimize the number of external devices that need to be trusted. A commercial and bespoke noise sources could be digitized separately and combined. NIST Special Publication 800-90B includes validation and health test procedures nose sources intended for use in cryptographic equipment. If entropy can be generated at 100 MB/s, a 2 TB SSD memory could be filled in under 6 hours.

Terakey Refresh

Assuming all stations on a Terakey network can communicate with a central administrative site, it would be possible for each to periodically send a list of the addresses of used Terakey bytes. These could be collected and merged and sent to the remote sites. Once all had acknowledged receipt, the used bytes could be replaced with fresh bytes, perhaps from a set of spare bytes shipped with the original Terakey. Alternatively, or as a backup if the spare bytes were used up before they could be replenished, the replacements could be generated using a conventional cipher.

Key Destruction

Destruction of a Terakey, say when physical security is being compromised, is more difficult than for a traditional short key. The classic approach, thermite (U.S. Army, 1981), would violate most current workplace safety standards, not to mention fire codes. Writing over data on hard disks can be used to sanitize them, but the process can take hours for large capacity drives. NAND solid state drive technology allows for rapid erase function by setting all bits in a block to 1s. and many if not most solid state drives have a special ATA Secure Erase command that perform this function on all blocks. The Secure Erase command takes time proportional to the drive's capacity, one vendor's website estimates 20 seconds for a 512 GB unit. Storing the Terakey in a physical safe, with internal battery back-up, would allow completion of the Secure Erase function, even in the event external power was removed in an active attack.

Another approach would be to use whole disk encryption to protect the Terakey, with provision for destroying the disk encryption key when necessary, NIST calls this method Cryptographic Erase (CE). Note that this is no less effective than similar measures commonly employed to protect decrypted messages and other sensitive information stored at the same site, and also would protect the Terakey during transport. Cryptographic erase is nearly instantaneous, but auditing devices to insure it is being done properly is difficult. Cryptographic erase can be combined with ATA Secure Erase, with the CE performed first.

Overwriting is not generally recommended as a way to sanitize SSDs because the controller manages the relationship between logical addresses and flash memory physical addresses to reduce ware on the flash memory, which has limited number of write cycles per block. This can result in sensitive information being stored in inactive blocks that are not accessible. However, for Terakey, the SSD need only be written once, so the fragmentation from wear leveling may not occur. SSDs can have much faster write speeds (3,300 MB/s) (Armstrong, 2019) than rotating hard drives, but even then, overwriting a two terabyte SSD module could take ten minutes. Overwrite could serve as a fall back if the Secure Erase command fails, as reflected by a read test that did not return all 1s.

Physical destruction is the ultimate approach. The United States National Security Agency publishes guidelines for digital media destruction, along with lists of approved destruction device vendors (U.S. National Security Agency).

Partial Destruction Security

In a situation where the Terakey should be destroyed, such as detection of tampering with its storage container or an expectation that physical security may be compromised, it may not be possible to be sure that the Terakey is completely destroyed. Removing power from random access memory may not erase all cells completely. Using incendiary agents such as Thermite might not completely destroy all memory components. Terakey is somewhat resistant to partial key recovery since key bytes from many random sectors of the Terakey are required for each encryption or decryption.

Resilience

Terakey is intrinsically resilient to storage failures. Bad blocks in the key store will only be used infrequently. If detected on transmission, a new seed for R and b generated, which will be unlikely to need the bad block, or error-correcting codes can be used to recover from the occasional garbled byte. Even if an entire solid-state memory fails and there is no loaded spare, other stations can be advised and can fall back to a Terakey that excludes the data in the bad module when communicating with the station that experienced the failure. Provisions for this situation can be included in the Terakey software. Each loaded Terakey storage module could have a unique ID, perhaps derived from a hash of its contents. The stations on the network could maintain tables of the module online at each location and form Terakeys from the modules accordingly. The order of the modules used might be changed periodically.

Performance

Storing the Terakey in RAM would offer the highest performance. Solid state drives would offer the next highest performance. Solid state drives currently cost about twice as much per gigabyte of storage as rotating magnetic disks, but the overall cost per Terabyte is low enough that rotating media would only be used if there were specific reasons to prefer them.

If rotating media such as hard drives were used to store K, message encryption and decryption will typically require one disk access per byte of message. RAID technologies can spread the Terakey over multiple disks, which can speed access. Speed can be further improved by creating a list of the bytes from K that will be required and sorting them by disk, track and sector order. Then there will typically be ½ disk rotation latency per bye of message. At 7200 RPM (=120 Hz), a 1200-byte message would require about 5 seconds to encrypt or decrypt on a single hard drive. Multiple messages can be batched, their keys sorted and merged for access and then decrypted together to save time. All the computations can be pre-computed before the message arrives if the nonce is known to produces a set of working keys of some fixed size. Nonces could be pre-agreed, say a hash of the date, sending station name, receiving station name, message number, and, perhaps, a secret of the day, sent the previous day. These precomputed working keys could then be used to rapidly decode messages.

Two stage Terakey is another approach that could be used to solve speed problems. A Terakey small enough to fit in random access memory could be extracted and used for one crypto period (say a day) could be extracted from disk. This would increase the rate of collisions, however. Using a byte size larger than 8-bits can also improve speed, at the cost of larger amounts of data compromised when a byte leak occurs.

Cost

Terakey can be implemented on any computer with a mass storage port, such as USB, SATA or PCIe. The cost for solid state storage is under $200 per terabyte as of April 2020. Price quotations for off-the-shelf QKD systems are hard to come by.

Reliability

Terakey has no requirement to maintain quantum coherence over long distance. Very high traffic volume Terakey requires periodic physical transport for key refresh. Terakey is relatively resistant to point failures. A bad block would be accessed infrequently and could be compensate for by including a simple check sum to detect defective session keys, requiring a new key be formed and transmitted, or using error correcting codes to repair damage from bad bytes. Assuming the Terakey was stored on multiple modules, even if an entire module were defective and no replacement were available, other stations could be instructed to modify their Terakey algorithm to avoid the bad module until it could be replaced.

Maintainability

Terakey uses standard, off-the-shelf components. Full back up is inexpensive. Maintenance can be performed by ordinary computer technicians.

Need for Key Refresh

QKD by its nature does not need key refresh. Terakey's security would degrade over time under the assumption that an attacker knows all or a large fraction of previous messages sent, the "known plaintext attack". However, in the key distribution use case "known plaintext" actually means knowing the session key for each message sent. So, for example, if Terakey is used to exchange AES session keys for individual emails or transmission packets, it would not be enough to recover the plaintext of the emails or packets. One would have to cryptanalyze AES to recover a large fraction of those session keys. If that were indeed possible, the security of AES would be called into question for QKD as well.

Need for Dedicated Fiber Channel

A dedicated fiber channel is required for many versions of QKD. Not only is this a cost issue, but also it makes QKD more subject to denial of service attack. Terakey can use any communication channel, including the public Internet, HF radio, and even paper messages. There is also no need for a backchannel to coordinate quantum measurements, as in the BB84 protocol, for example. The receiving party in a Terakey communication can maintain complete radio silence.

Requirement for Physical Security

Both methods require continuous physical security to prevent tampering, both while transported to user sites and on an ongoing basis when installed. A skilled attacker with physical access to a quantum encryption device can potentially install modifications that subvert security, say by storing keys and leaking them through side channels.

Auditability

Technology can be built from off-the-shelf mass-market components with simple, easy-to-audit software. QKD requires very specialized knowledge, at the PhD in Quantum Physics level, to audit, assuming QKD providers are willing to allow an audit. A variety of tools and devices are available to state-level actors, at least, to compromise the integrity of any device whose continuous physical security is not assured.

Speed

Toshiba reported in 2018 a speed in excess of 10 megabits per second over a 7 km fiber (Boyd, 2018). Depending on type of storage used, Terakey is capable of comparable speeds. Several commercial SSD modules offer speeds at the 350K IOPS level for random reads. That speed would allow access at a rate of 2.8 megabits per second. These speeds assume a significant queue depth, but that should be achievable if a Terakey system is operated at high speed. If the Terakey is stored on multiple modules, say ten 1 TB units, it should be possible to access the modules in parallel, allowing speeds up to 28 megabits per second. Modern CPUs should be able to handle the associated computational workload.

Using Terakey With Quantum Key Distribution

Terakey could be used synergistically with Quantum Key Distribution in situations where QKD links are established between a limited number of locations and high-level security is desired for additional locations. For example, an international bank might use QKD between its main offices in different countries, but it might be too expensive for individual branches. QKD could be used to initialize or update Terakeys for local branch or mobile use within each country.

CONCLUSION

Terakey is not a universal solution for all communications security problems, but it does address two issues with widely used encryption systems, the lack of mathematical proofs of security, and the risk of surreptitious key exfiltration, and it provides an alternative for comparison with quantum key distribution.

Throughout the entirety of the present disclosure, use of the articles "a" or "an" to modify a noun may be understood to be used for convenience and to include one, or more than one of the modified noun, unless otherwise specifically stated.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein. Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system for encryption comprising:
a message management module (MMM);
a restricted secret server (RSS) including a restricted secret server network interface (RSS-NI) connected to the MMM and including at least one very large key (VLK) module;
a Data Guard disposed between the RSS-NI and the at least one VLK module; and
wherein the Data Guard is configured to restrict and sanitize request data by enforcing message formats and restricting a transfer rate of very large key (VLK) data.

2. The system of claim 1, wherein the at least one VLK module further comprises a VLK module alarm which is triggered when the at least one VLK module is removed from the RSS.

3. The system of claim 2, wherein the VLK module alarm comprises an optical sensor.

4. The system of claim 1, wherein the at least one VLK module comprises a plurality of grooves and flutes to prevent insertion of an unauthorized VLK module into the RSS.

5. The system of claim 1, wherein the at least one VLK module comprises a memory device having non-standard firmware including memory device control commands which differ from standard control commands of a corresponding standard memory.

6. The system of claim 1, wherein the Data Guard comprises:
a processor architecture wherein no data or code executed in a processor can affect its stored program; and
wherein the Data Guard uses non-standard connectors.

7. A method for encrypting data comprising:
receiving a first message on at least one message management module (MMM);
securely sending the first message to a restricted secret server (RSS) having a very large key (VLK) module;
using a deterministic random number generator (DRNG) on the RSS;
seeding the DRNG with a seed;
using the seeded DRNG to select multiple subsets of data from a block of unpredictable data;
combining the multiple subsets of data from the block of unpredictable data to form a key stream; and
using a reversible operation to combine the key stream with a portion of the first message to create a second message;
securely sending the second message to the at least one MMM, wherein securely sending a return message comprises:
sending the return message from the restricted secret server via a second dedicated link to the at least one Data Guard;
authenticating the second message on the at least one Data Guard; and
forwarding the second message via a secure, authenticated link to the at least one MMM; and
wherein only the at least one MMM can query the RSS using a secure link within one of:
a data center's intranet to access the RSS; and
a direct communication link between the at least one MMM and the RSS.

8. The method of claim 7 further comprising:
loading the block of unpredictable data K into a Very Large Key (VLK) module;
wherein K is a generated key string having a length greater than one gigabyte;
converting plaintext byte of a message, P(n), to cipher text by C(n)=P(n) o K(R(v, n));
where v is a message indicator;
o is a reversible operation such as bit-wise exclusive-or (xor) or modular addition that combines two bytes to form a third byte;
P is a string of bytes that is plaintext;
C is a string of bytes that is the cipher text;
n is an index variable, so P (n) is an nth byte in P;
R is a deterministic pseudo-random number generator;
v is a message indicator which serves as the seed to the pseudo-random number generator; and
R(v, n) is an nth byte output from R when it is initialized by v.

9. The method of claim 7 comprising:
generating the seed for the DRNG in the RSS; and
returning the seed along with a second message to at least one MMM.

10. The method of claim 7 comprising:
generating the seed for the DRNG outside the RSS; and
transmitting the seed to the RSS.

11. The method of claim 7 comprising:
deriving the seed for the DRNG from a first message; and
transmitting the seed to the RSS.

12. The method of claim 7 where:
separate at least one MMMs are used for plaintext and ciphertext.

13. The method of claim 7 where:
separate Data Guards are used for plaintext and ciphertext.

14. The method of claim 7 further comprising:
limiting a rate at which messages are passed between the RSS and the MMM such that an amount of data coming out of the RSS is limited.

15. The method of claim 7, wherein the VLK module is removable from the restricted secret server and further comprising:
providing a secure interlock between the VLK module and the restricted secret server.

16. The method of claim 15, wherein the VLK module is removable and is located in a sealed unit designed to plug only into corresponding restricted secret servers.

17. The method of claim 7, wherein transferring the block of unpredictable data takes longer than ten minutes which deters exfiltrating the block of unpredictable data out of the restricted secret server.

18. The method of claim 7 wherein the at least one Data Guard sanitizes data, enforces message formats and restricts a rate at which data received from the RSS are retransmitted to the MMM.

19. The method of claim 7 wherein the at least one Data Guard matches outputs with requests.

* * * * *